US009342559B1

(12) United States Patent
Jedrzejowicz

(10) Patent No.: US 9,342,559 B1
(45) Date of Patent: May 17, 2016

(54) AUTOMATIC MATCHING OF USERS AND SERVICE PROVIDERS

(71) Applicant: GOOGLE INC., Mountain View, CA (US)

(72) Inventor: Jan Jedrzejowicz, Palo Alto, CA (US)

(73) Assignee: Google Inc., Mountain View, CA (US)

(*) Notice: Subject to any disclaimer, the term of this patent is extended or adjusted under 35 U.S.C. 154(b) by 340 days.

(21) Appl. No.: 13/894,934

(22) Filed: May 15, 2013

(51) Int. Cl.
*G06F 17/30* (2006.01)

(52) U.S. Cl.
CPC ................ *G06F 17/3053* (2013.01)

(58) Field of Classification Search
CPC .................................................. G06F 17/3053
See application file for complete search history.

(56) References Cited

U.S. PATENT DOCUMENTS

| 6,389,278 | B1 * | 5/2002 | Singh ......................... 455/414.3 |
| 6,393,412 | B1 * | 5/2002 | Deep ............................ 705/400 |
| 8,412,709 | B1 * | 4/2013 | Belwadi et al. ............... 707/736 |
| 8,805,844 | B2 * | 8/2014 | Schorzman et al. .......... 707/738 |
| 8,819,566 | B2 * | 8/2014 | Mehin et al. .................. 715/758 |
| 8,868,448 | B2 * | 10/2014 | Freishtat et al. ............ 705/26.41 |
| 2003/0014295 | A1 * | 1/2003 | Brookes et al. .................. 705/9 |
| 2005/0182743 | A1 * | 8/2005 | Koenig ............................. 707/1 |
| 2007/0150372 | A1 * | 6/2007 | Schoenberg .................... 705/26 |
| 2008/0065726 | A1 * | 3/2008 | Schoenberg ................... 709/205 |
| 2009/0276419 | A1 * | 11/2009 | Jones et al. ........................ 707/5 |
| 2011/0246334 | A1 * | 10/2011 | Schoenberg et al. ........ 705/27.1 |
| 2013/0110822 | A1 * | 5/2013 | Ikeda et al. .................... 707/722 |

OTHER PUBLICATIONS

Wikipedia, "Automatic Call Distributor", http://en.wikipedia.org/wiki/Automatic_call_distributor, Feb. 27, 2013, 3 pages.
Wikipedia, "Call Centre", http://en.wikipedia.org/wiki/Call_centre, Mar. 9, 2013, 12 pages.

* cited by examiner

*Primary Examiner* — Richard Bowen
(74) *Attorney, Agent, or Firm* — Fish & Richardson P.C.

(57) ABSTRACT

A system is configured to receive a search query from a user device; identify a set of organizations that offer services relevant to the search query; generate first scores for the set of organizations using a first scoring function; generate a document that includes information identifying the set of organizations based on the first scores; provide the document to the user device; receive, based on providing the document to the user device, information indicating a selection of one of the set of organizations as a selected organization; identify a set of service providers, associated with the selected organization, that offer the services relevant to the search query; generate second scores for the set of service providers using a second scoring function, where the second scoring function may be different from the first scoring function; select or receive selection of one of the set of service providers, as a selected service provider, based on the second scores; and cause a video communication session to be established between the user device and a device associated with the selected service provider.

19 Claims, 16 Drawing Sheets

FIG. 6A

AUTOMATIC MATCHING OF USERS AND SERVICE PROVIDERS

BACKGROUND

Many techniques are available to users today to find services via the World Wide Web ("web"). For example, users often use web browsers and/or local search engines to find service providers that provide the services of interest.

Local search engines provide business listings as search results in response to a search query from a user. A business listing typically includes a link to a web site for the business and may include information regarding the business, such as business hours, business address, and/or a review of the business.

SUMMARY

According to some possible implementations, a method, performed by one or more server devices, may include receiving a search query from a user device; identifying a set of organizations that offer services relevant to the search query; generating first scores for the set of organizations using a first scoring function; generating a document that includes information identifying the set of organizations based on the first scores; providing the document to the user device; receiving, based on providing the document to the user device, information indicating a selection of one of the set of organizations as a selected organization; identifying a set of service providers, associated with the selected organization, that offer the services relevant to the search query; generating second scores for the set of service providers using a second scoring function, where the second scoring function may be different from the first scoring function; selecting or receiving selection of one of the set of service providers, as a selected service provider, based on the second scores; and causing a video communication session to be established between the user device and a device associated with the selected service provider.

According to some possible implementations, the first scoring function may use a different set of signals than a set of signals used by the second scoring function.

According to some possible implementations, the first scoring function may use a same set of signals as the second scoring function, the first scoring function may assign first weights to the set of signals, the second scoring function may assign second weights to the set of signals, and the first weights may be different than the second weights.

According to some possible implementations, selecting or receiving selection of the one of the set of service providers may include automatically selecting the one of the set of service providers, where the one of the set of service providers may have a highest score of the second scores for the set of service providers.

According to some possible implementations, the document is a first document, and where selecting or receiving selection of the one of the set of service providers may include: generating a second document that includes information identifying the set of service providers based on the second scores; providing the second document to the user device; and receiving, based on providing the second document to the user device, information indicating a selection of the one of the set of service providers as the selected service provider.

According to some possible implementations, the method may further include receiving feedback from a user of the user device, where the feedback may relate to the video communication session; and using the feedback to adjust the first scoring function or the second scoring function.

According to some possible implementations, the video communication session may permit the selected service provider to provide, in real time, a service to a user of the user device.

According to some possible implementations, a system may include one or more server devices to: receive a search query from a user device; identify a set of organizations that offer services relevant to the search query; generate first scores for the set of organizations using a first scoring function; generate a document that includes information identifying the set of organizations based on the first scores; provide the document to the user device; receive, based on providing the document to the user device, information indicating a selection of one of the set of organizations as a selected organization; identify a set of service providers, associated with the selected organization, that offer the services relevant to the search query; generate second scores for the set of service providers using a second scoring function, where the second scoring function may be different from the first scoring function; select one of the set of service providers, as a selected service provider, based on the second scores; and cause a video communication session to be established between the user device and a device associated with the selected service provider.

According to some possible implementations, the one or more server devices, when generating the document, may form a ranked list that includes information identifying the set of organizations in an order based on the first scores, and generate the document to include information from the ranked list.

According to some possible implementations, the one or more server devices, when selecting the one of the set of service providers, may automatically select the one of the set of service providers, where the one of the set of service providers may have a highest score of the second scores for the set of service providers.

According to some possible implementations, the one or more server devices may further determine a length of time associated with the video communication session; and send information regarding the length of time to a billing server for calculation of a charge for the video communication session.

According to some possible implementations, the one or more server devices may further receive feedback from a user of the user device, where the feedback may relate to the video communication session; and use the feedback to adjust the first scoring function or the second scoring function.

According to some possible implementations, the video communication session may permit the selected service provider to provide, in real time, a service to a user of the user device.

According to some possible implementations, at least one of the first scoring function or the second scoring function may use a set of signals that includes two or more of: information regarding a quantity or a ratio of video communication sessions involving service providers associated with the set of organizations, information regarding lengths of video communication sessions involving service providers associated with the set of organizations, information regarding ratings of the set of organizations, information regarding reviews of the set of organizations, information regarding ratings of service providers associated with the set of organizations, information regarding reviews of service providers associated with the set of organizations, information regarding prior video communication sessions between a user of the user device and service providers associated with the set of organizations, information regarding areas or levels of expertise of service providers associated with the set of organizations, information regarding an amount of money that a user of the user device has spent for video communication sessions, information regarding time spent by a user of the user device searching for video communication sessions, browsing for video communication sessions, or involved in video communication sessions, information regarding waiting times of service providers associated with the set of organizations, information regarding a cost charged for services by the set of organizations, information regarding one or more geographic areas with which the set of organizations or service providers associated with the set of organizations are associated, or information regarding a quality of connection of the user device or communication devices used by service providers associated with the set of organizations.

According to some possible implementations, a computer-readable medium may store instructions, where the instructions may include a set of instructions which, when executed by one or more processors associated with one or more server devices, cause the one or more processors to: receive a search query from a user device; identify a set of organizations that offer services relevant to the search query; generate first scores for the set of organizations using a first scoring function; generate a document that includes information identifying the set of organizations based on the first scores; provide the document to the user device; receive, based on providing the document to the user device, information indicating a selection of one of the set of organizations as a selected organization; identify a set of service providers, associated with the selected organization, that offer the services relevant to the search query; generate second scores for the set of service providers using a second scoring function, where the second scoring function may be different from the first scoring function; receive selection of one of the set of service providers, as a selected service provider, based on the second scores; and cause a video communication session to be established between the user device and a device associated with the selected service provider.

According to some possible implementations, the first scoring function may use a different set of signals than a set of signals used by the second scoring function.

According to some possible implementations, the first scoring function may use a same set of signals as the second scoring function, the first scoring function may assign first weights to the set of signals, the second scoring function may assign second weights to the set of signals, and the first weights may be different than the second weights.

According to some possible implementations, the document is a first document, and where one more instructions, of the set of instructions, to receive selection of the one of the set of service providers, may further cause the one or more processors to: generate a second document that includes information identifying the set of service providers based on the second scores; provide the second document to the user device; and receive, based on providing the second document to the user device, information indicating a selection of the one of the set of service providers as the selected service provider.

According to some possible implementations, the set of instructions which, when executed by the one or more processors, may further cause the one or more processors to: determine a length of time associated with the video communication session; and send information regarding the length of time to a billing server for calculation of a charge for the video communication session.

According to some possible implementations, at least one of the first scoring function or the second scoring function may use a set of signals that includes two or more of: information regarding a quantity or a ratio of video communication sessions involving service providers associated with the set of organizations, information regarding lengths of video communication sessions involving service providers associated with the set of organizations, information regarding ratings of the set of organizations, information regarding reviews of the set of organizations, information regarding ratings of service providers associated with the set of organizations, information regarding reviews of service providers associated with the set of organizations, information regarding prior video communication sessions between a user of the user device and service providers associated with the set of organizations, information regarding areas or levels of expertise of service providers associated with the set of organizations, information regarding an amount of money that a user of the user device has spent for video communication sessions, information regarding time spent by a user of the user device searching for video communication sessions, browsing for video communication sessions, or involved in video communication sessions, information regarding waiting times of service providers associated with the set of organizations, information regarding a cost charged for services by the set of organizations, information regarding one or more geographic areas with which the set of organizations or service providers associated with the set of organizations are associated, or information regarding a quality of connection of the user device or communication devices used by service providers associated with the set of organizations.

According to some possible implementations, a system may include means for receiving a search query from a user device; means for identifying a set of organizations that offer services relevant to the search query; means for generating first scores for the set of organizations using a first scoring function; means for generating a document that includes information identifying the set of organizations based on the first scores; means for providing the document to the user device; means for receiving, based on providing the document to the user device, information indicating a selection of one of the set of organizations as a selected organization; means for identifying a set of service providers, associated with the selected organization, that offer the services relevant to the search query; means for generating second scores for the set of service providers using a second scoring function, where the second scoring function may be different from the first scoring function; means for selecting or receiving selection of one of the set of service providers, as a selected service provider, based on the second scores; and means for causing a video communication session to be established between the user device and a device associated with the selected service provider.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 6A-6D illustrate another example for establishing a session between a user and a service provider.

DETAILED DESCRIPTION

The following detailed description refers to the accompanying drawings. The same reference numbers in different drawings may identify the same or similar elements.

A system and/or method, as described herein, may automatically match users to service providers, via interactive sessions, to enable the service providers to provide real-time services to the users. An interactive session, as used herein, may refer to a video communication session, an audio communication session, a text-based communication session, or a combination of video, audio, and/or text-based communication sessions. In some implementations, an interactive session may correspond to a real-time communication session. The term real-time, as used herein, may include near real-time, which may correspond, for example, to real-time with delays associated with transmitting data between devices, processing data, etc.

Figure 1A:
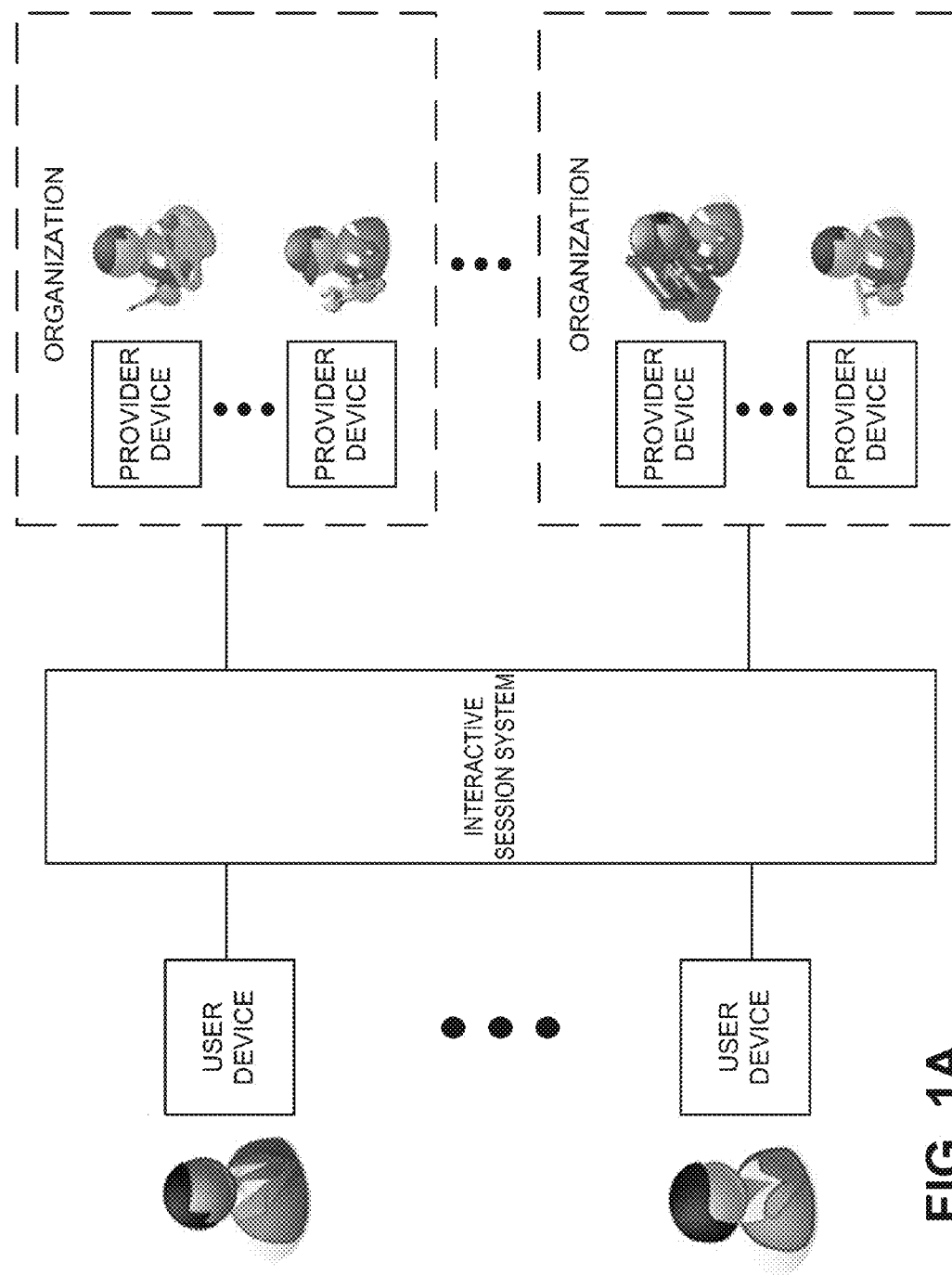
FIGS. 1A and 1B are diagrams illustrating an overview of an example implementation described herein.
Figure 1B:

FIGS. 1A and 1B are diagrams illustrating an overview of an example implementation described herein. As shown in FIG. 1A, an interactive session system may connect user devices to provider devices that are associated with one or more organizations. An organization may include a company, an enterprise, a foundation, a non-governmental organization, an association, a service network, or an individual. Generally, an organization may include individuals who are employed by, or otherwise associated with, the organization and who provide certain services. These individuals will be referred to herein as service providers. In some implementations, an organization may correspond to a single individual and, in this situation, may be synonymous with service provider.

The interactive session system may permit a user to find a service provider who provides a particular service in which the user is interested. The user may use a user device to provide a search query, to the interactive session system, to identify organizations that offer the service in which the user is interested. The interactive session system may perform a search, based on the search query, to identify organizations that are relevant to the search query. The interactive session system may assign scores to the organizations using a first scoring function, and may create a ranked list that includes information identifying the organizations based on the scores. The interactive session system may provide the ranked list to the user via the user device.

The user may select a particular organization from the ranked list. The interactive session system may identify service providers, employed by the particular organization, who are capable of providing the service in which the user is interested. The interactive session system may assign scores to the service providers using a second scoring function, and may create a ranked list that includes information identifying the service providers based on the scores. The interactive session system may provide the ranked list to the user via the user device. The user may select a particular service provider from the ranked list. The interactive session system may automatically connect the user device and a provider device, associated with the particular service provider, for an interactive session. The particular service provider may provide the particular service to the user via the interactive session.

As shown in FIG. 1B, the user and the particular service provider may be connected for the interactive session via the user device and the provider device, respectively. Assume that the user seeks assistance with a painting project and the particular service provider is a skilled painter. In this case, the user may watch the particular service provider as the particular service provider assists the user with the user's painting project. As shown in FIG. 1B, the user may watch the particular service provider, via the user device, as the particular service provider demonstrates a painting technique. As also shown in FIG. 1B, the particular service provider may see and interact with the user via the provider device associated with the particular service provider.

The interactive session system, as described herein, may automatically and seamlessly match users to organizations and then to particular service providers associated with those organizations. As a result of the matching, the users may obtain real-time services via interactive sessions. Thus, rather than requiring a user to have to travel to a service provider or wait for a service provider to travel to the user, the user may obtain a real-time service at the user's convenience, which may lead to a favorable user experience in obtaining the service.

Figure 2:
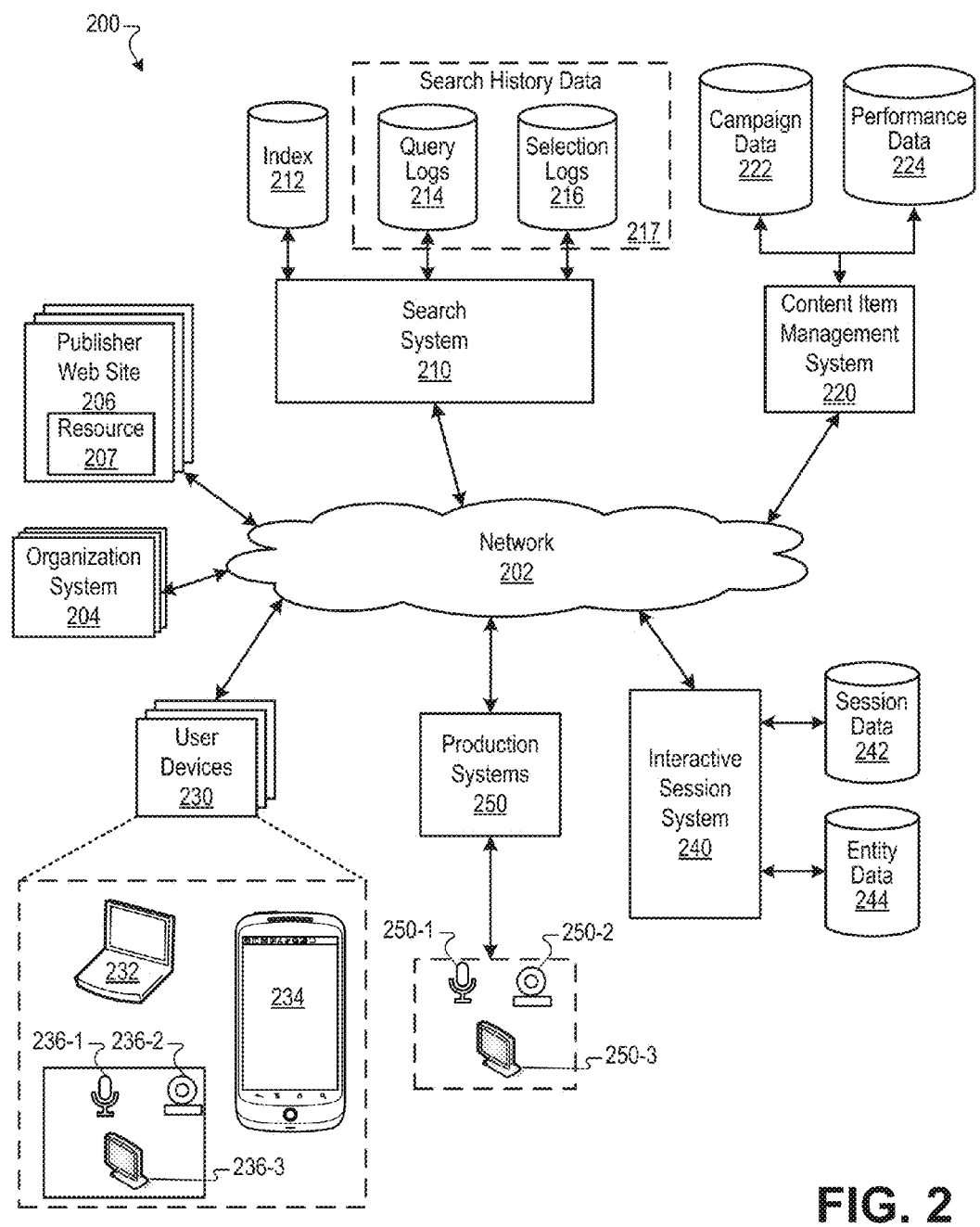
FIG. 2 is a diagram of an example environment in which techniques described herein may be implemented.

FIG. 2 is a diagram of an example environment 200 in which techniques described herein may be implemented. As shown in FIG. 2, environment 200 may include a network 202, organization systems 204, publisher web sites 206, search system 210, content item management system 220, user devices 230, interactive session system 240, and production systems 250.

The network 202 can include, for example, a local area network (LAN), a cellular phone network, a wide area network (WAN), e.g., the Internet, or a combination of these or other types of networks. The network 202 enables data communication between multiple electronic devices. Users can access content, provide content, exchange information, and participate in interactive sessions by use of devices and systems that can communicate with each other over the network 202. Links on the network 202 can be wired links, wireless links, or both wired and wireless links.

An organization system 204 may include one or more communication devices associated with an organization. The organization may employ, or have associated therewith, individuals—referred to herein as "service providers"—who provide certain services, such plumbing services, gardening services, real estate services, fitness services, or any other kinds of service. The services may correspond to any service that can be performed by an individual for another individual. The service providers may use communication devices, of organization system 204, to communicate in real time with users of user devices 230.

A publisher web site 206 includes one or more resources 207 associated with a domain and hosted by one or more server devices in one or more locations. Generally, a web site is a collection of web pages formatted in hypertext markup language (HTML) that can contain text, images, multimedia content, and programming elements, for example, scripts. Each web site is maintained by a content publisher, which is an entity that controls, manages, and/or owns the web site.

A resource 207 may include any data that can be provided by a publisher web site 206 over the network 202 and that has a resource address, e.g., a uniform resource locator (URL). The resources 207 may be HTML pages, electronic documents, images files, video files, audio files, and feed sources, to name just a few. The resources 207 may include embedded information, e.g., meta information and hyperlinks, and/or embedded instructions, e.g., client-side scripts.

In operation, search system 210 may include one or more server devices that crawl the publisher web sites 206 and index the resources 207 provided by the publisher web sites 206 in an index 212. The search system 210 can receive queries from user devices 230. In response to each query, the search system 210 searches the index 212 to identify resources 207 and information that are relevant to the query. The search system 210 identifies the resources 207 in the form of search results and returns the search results to the user device 230. A search result is data generated by the search system 210 that identifies a resource 207 or provides information that satisfies a particular search query. A search result for a resource 207 can include a web page title, a snippet of text extracted from the web page, and/or a resource locator for the resource 207, e.g., the URL of a web page.

The search results are ranked based on scores related to the resources 207 identified by the search results, e.g., information retrieval ("IR") scores, and optionally a separate ranking of each resource 207 relative to other resources 207, e.g., an authority score. The search results are ordered according to these scores and provided to the user device 230 according to the order. The user device 230 receives the search results and presents the search results to a user. If a user selects a search result, the user device 230 requests the corresponding resource 207. The publisher of the web site hosting the resource 207 receives the request for the resource 207 and provides the resource 207 to the user device 230.

In some implementations, the queries submitted from user devices 230 are stored in query logs 214. Selection data for the queries and the web pages referenced by the search results and selected by users are stored in selection logs 216. The query logs 214 and the selection logs 216 define search history data 217 that include data from and/or related to previous search requests associated with unique identifiers. The selection logs 216 represent actions taken responsive to search results provided by the search system 210. The query logs 214 and selection logs 216 can be used to map queries submitted by user devices 230 to resources that were identified in search results and the actions taken by users when presented with the search results in response to the queries. In some implementations, data is associated with the identifiers associated with the search requests so that a search history for each identifier can be accessed. The selection logs 216 and query logs 214 can thus be used by the search system 210 to determine the respective sequences of queries submitted by the user devices 230, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before the data is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content item management system 220 may include one or more server devices that provide content items for presentation with the resources 207. A variety of appropriate content items can be provided—one example content item is an advertisement. In the case of advertisements, the content item management system 220 allows advertisers to define selection rules that take into account attributes of the particular user to provide relevant advertisements for the user. Example selection rules include keyword selection, in which advertisers provide bids for keywords that are present in either search queries, resource content, or metadata. Advertisements that are associated with keywords having bids that result in an advertisement slot being awarded are selected for displaying in the advertisement slots.

When a user of the user device 230 selects an advertisement, the user device 230 generates a request for a landing page of the advertisement, which is typically a web page of the advertiser. The relevant advertisements can be provided for presentation on the resources 207 of the publisher web sites 206, or on a search results page. For example, a resource 207 from a publisher web site 206 may include instructions that cause a user device to request advertisements from the content item management system 220. The request includes a publisher identifier and, optionally, keyword identifiers related to the content of the resource 207. The content item management system 220, in turn, provides advertisements to the requesting user device 230. With respect to a search results page, the user device 230 renders the search results page and sends a request to the content item management system 220, along with one or more keywords related to the query that the user device 230 provided to the search system 210. The content item management system 220, in turn, provides advertisements to the requesting user device 230.

In the case of advertisements, the content item management system 220 includes a data storage system that stores campaign data 222 and performance data 224. The campaign data 222 stores advertisements, selection information, and/or budgeting information for advertisers. The performance data 224 stores data indicating the performance of the advertisements that are served. Such performance data can include, for example, click-through rates for advertisements, the number of impressions for advertisements, and the number of conversions for advertisements. Other performance data can also be stored.

The campaign data 222 and the performance data 224 are used as an input to an advertisement auction. In particular, the content item management system 220, in response to each request for advertisements, conducts an auction to select advertisements that are provided in response to the request.

The advertisements are ranked according to a score that, in some implementations, is proportional to a value based on an advertisement bid and one or more parameters specified in the performance data 224. The highest ranked advertisements resulting from the auction are selected and provided to the requesting user device 230.

A user device 230 is an electronic device, or collection of devices, that is capable of requesting and receiving resources over the network 202. Example of user devices 230 include personal computers 232, mobile communication devices 234, and/or other devices that can send and receive data over the network 202. Generally, user device 230 may include an audio input device 236-1, a video input device 236-2, and/or a display device 236-3.

A user device 230 typically includes a user application, e.g., a web browser, that sends and receives data over the network 202, generally in response to user actions. The web browser can enable a user to display and interact with text, images, videos, music and other information typically located on a web page at a web site on the world wide web or a local area network.

An interactive session system 240 may include one or more server devices that are accessible by organization systems 204 and user devices 230 over the network 202. The interactive session system 240 serves interactive sessions and data related to interactive sessions to users of user devices 230. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 240 may also provide interactive sessions for other appropriate event types.

Furthermore, the data that the interactive session system 240 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session, and the interactive session system 240 may also determine specific data to provide based on the intent. For example, a user that is viewing a session that describes building a computer, and with the intent to build the computer, may be presented with additional information, e.g., a list of parts, tools, and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by session creators, such as organizations and/or service providers. Examples of session creators include a licensed contractor for construction-related videos, a company that produces sessions for a particular product that the company manufactures, and a user who produces sessions relating to a particular topic.

In some implementations, the content item management system 220 can provide content items with the interactive sessions. In the case of advertisements, the content item management system 220 may select advertisements based on the subject matter of a session, the event type, and/or the user's intent. For example, for a repair event, the content item management system 220 may provide advertisements for providers of tools and parts that are listed in the list of tools and parts required to accomplish the repair task.

Production systems 250 can be used to create sessions. Production systems 250 may range from studios to simple hand-held video recording systems. Generally, a production system 250 is a system that includes one or more of an audio input device 250-1, a video input device 250-2, an optional display device 250-3, and optionally other input devices and production processes that are used to create sessions. For example, post production processes may be used to add metadata to an interactive session. Such metadata may include, for example, keywords and topical information that can be used to classify the session to one or more topical categories; a list of tools and parts required for a particular session and descriptions of the tools and parts; and so on.

Tactical sensory input devices may also be used in a production system 250. For example, a particular interactive session may provide input data for a "G-suit" that applies pressure to a user's body and that the user interprets as simulated motion. Accordingly, appropriate input systems are used in the production system 250 to generate and store the input data for the interactive session.

Production systems 250 may also be or include devices that are attached to a person. For example, for "point of view" sessions, wearable computer devices that include a camera input device and microphone input device may be worn on a user's person during the time that the user is creating the session.

The sessions are stored as sessions data 242 and are associated with authoring entities by entity data 244. A user can use a user device 230 to access the interactive session system 240 to request a session. The interactive session system 240 can provide a user interface to the user devices 230 in which interactive sessions are arranged according to a topical directory. In some implementations, the interactive session system 240 includes a search subsystem that allows users to search for interactive sessions. Alternatively, the search system 210 can search the session data 242 and the entity data 244.

A user experiences a session by use of one or more user devices 230. Different types of input and output devices may be used, depending on the type of interactive session. For example, an augmented reality visor that provides a view of a real-world environment augmented by computer-generated graphics may be used. A tactical sensory input device and a tactical sensory output device, that applies pressure to a user's body and that the user interprets as simulated motion or another type of feedback, may also be used.

Some implementations of an interactive session system 240 provide interactive sessions in real time. For example, real-time sessions may be provided by a company for repairing a product sold or repaired by the company when the user cannot find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

While FIG. 2 shows environment 200 as having a particular quantity and arrangement of devices and systems, environment 200 is not so limited. In practice, environment 200 may include additional devices and/or systems, fewer devices and/or systems, different devices and/or systems, or differently arranged devices and/or systems than are shown in environment 200. Also, in some instances, one device, in environment 200, may perform a function of another device in environment 200. Further, two or more devices, in environment 200, may be implemented as a single device or a single collection of devices. Additionally, or alternatively, any single device, in environment 200, may be implemented as multiple devices, which may be remotely located.

Figure 3A:
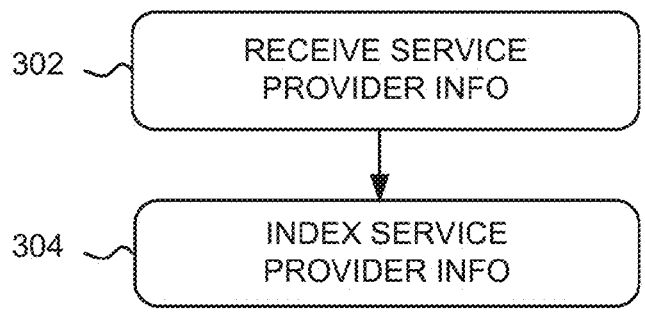
FIG. 3A is a flowchart of an example process for indexing service provider information.

FIG. 3A is a flowchart of an example process 300 for indexing service provider information. In some implementations, process 300 may be performed by interactive session system 240. In some implementations, process 300 may be performed by one or more other devices instead of, or possibly in conjunction with, interactive session system 240, such as an indexing system operating in conjunction with interactive session system 240. In some implementations, some or all of process 300 may be performed by search system 210, content item management system 220, and/or user devices 230.

As shown in FIG. 3A, process 300 may include receiving service provider information (block 302). For example, an interactive session system 240 may receive service provider information from organization systems 204. Examples of service provider information, which may be provided by a particular organization system 204, include: an identifier for the organization associated with the particular organization system 204, such as a name, a logo, a web site address, a telephone number, a facsimile number, an email address, or the like; information regarding the organization associated with the particular organization system 204, such as hours of operation of the organization, geographic locations of the organization, ratings of the organization, reviews of the organization, or the like; a description of the services offered by the organization associated with the particular organization system 204, such as identifiers of the services, keywords associated with the services, costs for obtaining the services, or the like; and/or information associated with service providers employed by the organization associated with the particular organization system 204, such as names of the service providers, geographic locations of the service providers, costs for obtaining services from the service providers, pictures of the service providers, video files and/or audio files involving the service providers, information identifying areas of expertise of the service providers, keywords regarding the areas and/or levels of expertise of the service providers, information regarding the availability of the service providers, network addresses of communication devices used by the service providers, ratings of the service providers, reviews of the service providers, or the like. These are merely examples of service provider information. In some implementations, the service provider information may include other types of information relating to organization systems 204 and/or the services offered by organization systems 204.

Process 300 may include indexing the service provider information (block 304). For example, interactive session system 240 may store the service provider information, received from organization systems 204, in one or more data structures, such as one or more indexes. The service provider information, in the one or more data structures, may be searched, by interactive session system 240, to identify organizations and/or service providers relevant to a search query from a user device 230 and/or to score an organization and/or service provider based on the search query. Any or all of the service provider information may be searchable and/or otherwise usable by interactive session system 240, and/or may be presented to a user of a user device 230. In some implementations, the service provider information may correspond to entity data 244 in FIG. 2.

While a series of blocks has been described with regard to FIG. 3A, the order of the blocks may be modified in some implementations. Further, non-dependent blocks may be performed in parallel. Also, one or more blocks may be omitted in some implementations.

Figure 3B:
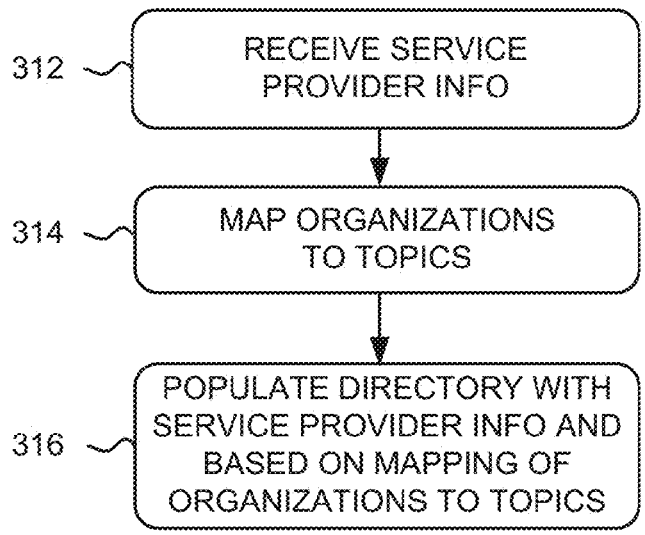
FIG. 3B is a flowchart of an example process for populating a directory with service provider information.

FIG. 3B is a flowchart of an example process 310 for populating a directory with service provider information. In some implementations, process 310 may be performed by interactive session system 240. In some implementations, process 310 may be performed by one or more other devices instead of, or possibly in conjunction with, interactive session system 240, such as a directory system operating in conjunction with interactive session system 240. In some implementations, some or all of process 310 may be performed by search system 210, content item management system 220, and/or user devices 230.

As shown in FIG. 3B, process 310 may include receiving service provider information (block 312). For example, interactive session system 240 may receive service provider information from organization systems 204. Examples of service provider information, which may be provided by a particular organization system 204, are provided above with regard to block 302 of FIG. 3A.

Process 310 may include mapping organizations to topics (block 314). For example, interactive session system 240 may map organizations, associated with organization systems 204, to topics in a topical directory based on the service provider information, information provided by the organizations, information about the organizations, or the like. In some implementations, a particular organization may map to multiple different topics in the topical directory. Any one or more of several techniques may be used to map organizations to topics, such as techniques based on keyword analysis, search logs, search query logs, topic maps, or the like.

Process 310 may include populating a directory with the service provider information and based on the mapping of the organizations to topics (block 316). For example, interactive session system 240 may create the topical directory by storing information, from the service provider information, relative to the topics in the topical directory. For each topic, interactive session system 240 may store an identifier for the organization, information regarding the organization, a description of the services offered by the organization, information associated with service providers employed by or associated with the organization, or the like. The topical directory may permit users to browse the topics to find organizations offering the services sought by the users.

While a series of blocks has been described with regard to FIG. 3B, the order of the blocks may be modified in some implementations. Further, non-dependent blocks may be performed in parallel. Also, one or more blocks may be omitted in some implementations.

Figure 3C:
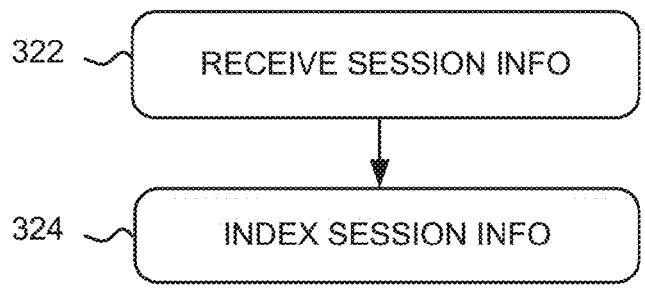
FIG. 3C is a flowchart of an example process for indexing session information.

FIG. 3C is a flowchart of an example process 320 for indexing session information. In some implementations, process 320 may be performed by interactive session system 240. In some implementations, process 320 may be performed by one or more other devices instead of, or possibly in conjunction with, interactive session system 240, such as an indexing system operating in conjunction with interactive session system 240. In some implementations, some or all of process 320 may be performed by search system 210, content item management system 220, and/or user devices 230.

As shown in FIG. 3C, process 320 may include receiving session information (block 322). For example, an interactive session system 240 may receive session information regarding an interactive session between a user device 230 and a communication device associated with an organization system 204. Examples of session information include information regarding user devices 230 or users of user devices 230 involved in sessions, such as user identifiers, identifiers of user devices 230, geographic locations of user devices 230, email addresses of the users, telephone numbers associated with the users or user devices 230, search history of the users or the user devices 230, browsing history of the users or the user devices 230, ratings provided by the users or the user devices 230, reviews provided by the users or the user devices 230, or the like; and/or information regarding a history of sessions involving the users, the user devices 230, and/or the organization systems 204, such as information identifying a time and/or date of a session, a length of a session, the user, user device 230, and/or service provider involved in a session, an outcome of a session, topic(s) associated with a session, a service provided in a session, the cost of a session, or the like. These are merely examples of session information. In some implementations, the session information may include other types of information relating to users, user devices 230, and/or organization systems 204.

Process 320 may include indexing the session information (block 324). For example, interactive session system 240 may store the session information, received from organization systems 204, in one or more data structures, such as one or more indexes. The session information, in the one or more data structures, may be searched, by interactive session system 240, to identify organizations and/or service providers relevant to a search query from a user device 230 and/or to score an organization and/or service provider based on the search query. Any or all of the session information may be searchable and/or otherwise usable by interactive session system 240, and/or may be presented to a user of a user device 230. In some implementations, the session information may correspond to session data 242 in FIG. 2.

While a series of blocks has been described with regard to FIG. 3C, the order of the blocks may be modified in some implementations. Further, non-dependent blocks may be performed in parallel. Also, one or more blocks may be omitted in some implementations.

Figure 4A:
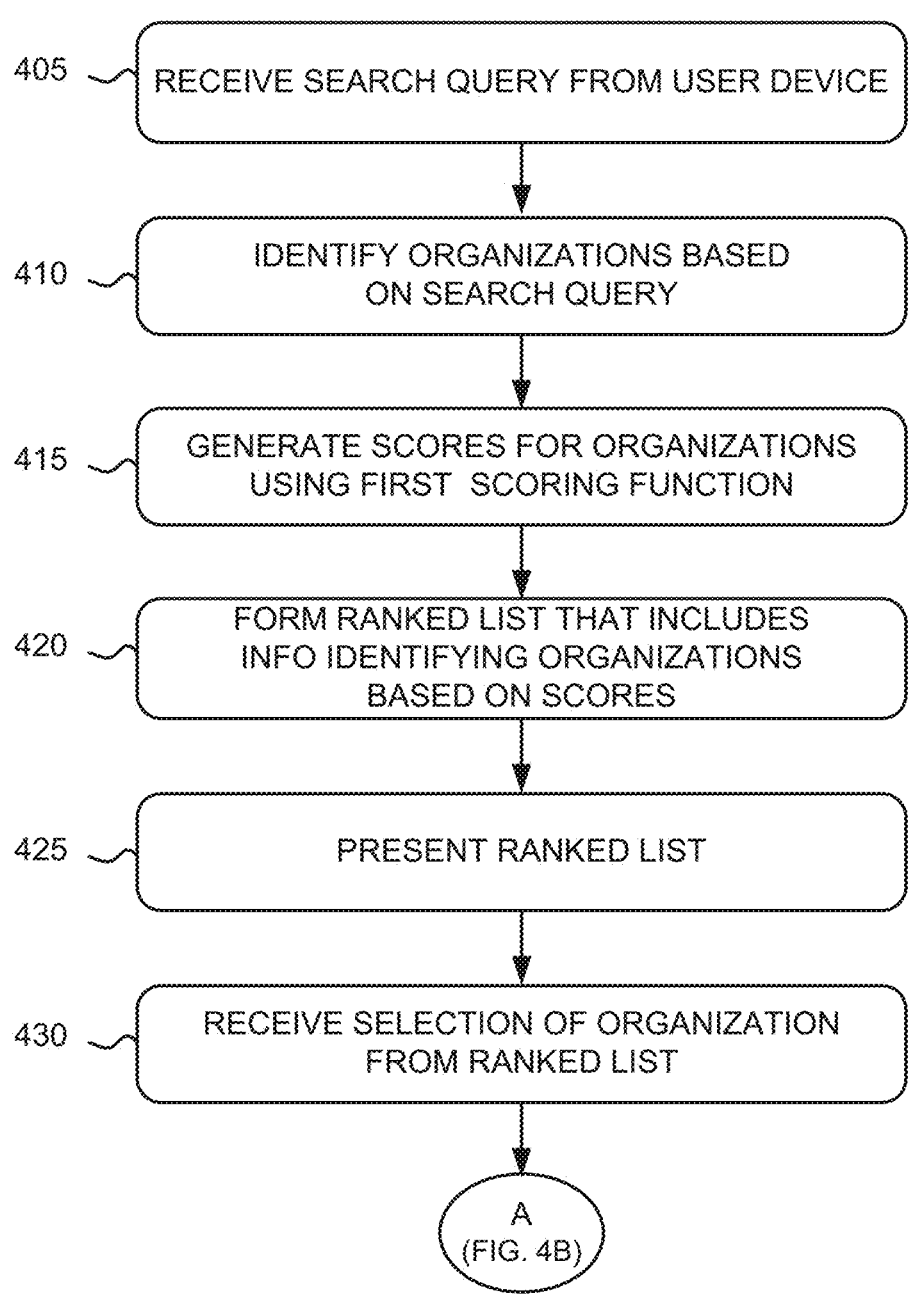
FIGS. 4A and 4B are a flowchart of an example process for connecting a user with a service provider to receive a service.
Figure 4B:
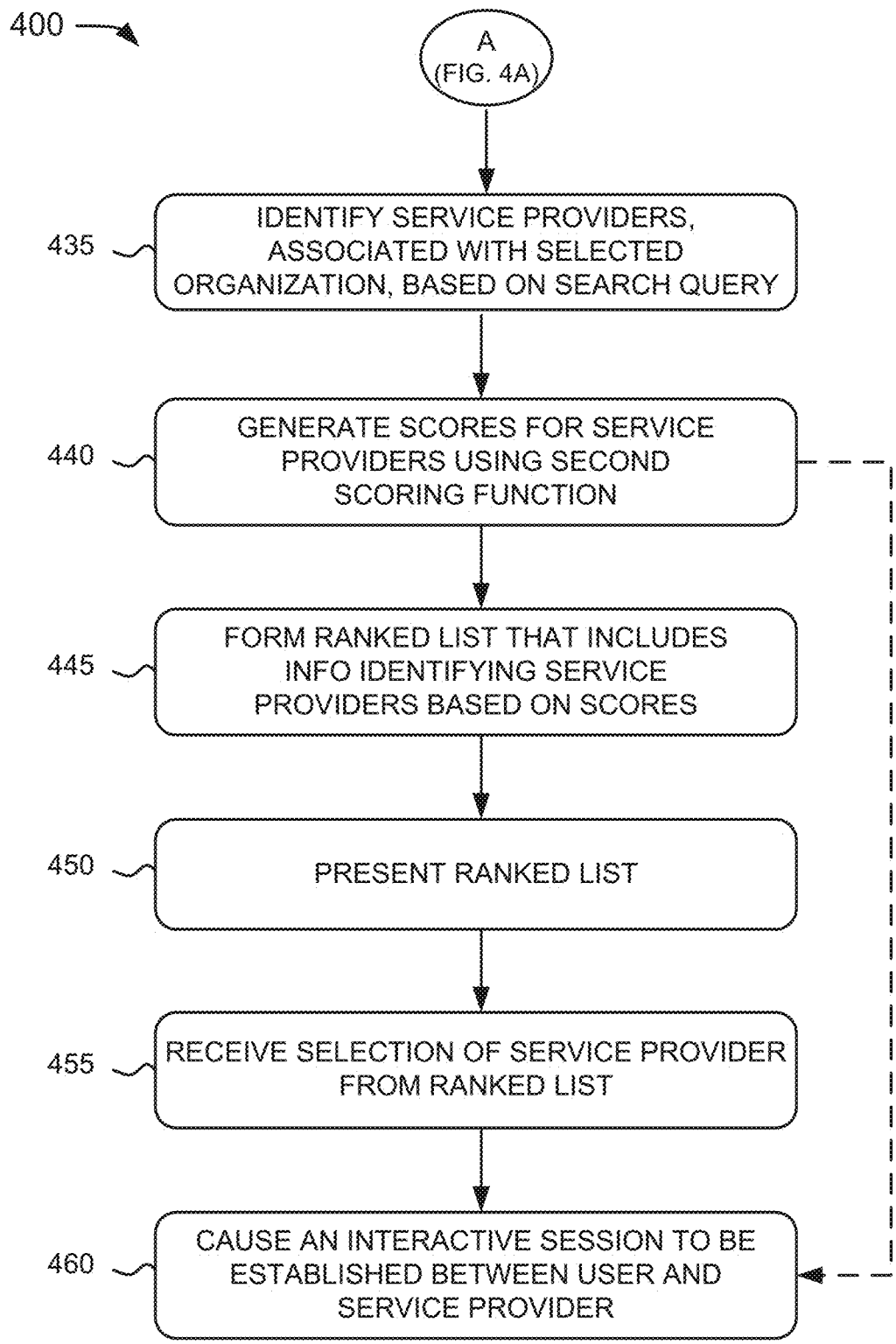

FIGS. 4A and 4B are a flowchart of an example process 400 for connecting a user with a service provider to receive a service. In some implementations, process 400 may be performed by interactive session system 240. In some implementations, process 400 may be performed by one or more other devices instead of, or possibly in conjunction with, interactive session system 240. For example, some or all of process 400 may be performed by search system 210, content item management system 220, and/or user devices 230.

As shown in FIG. 4A, process 400 may include receiving a search query from a user device (block 405). In some implementations, a user, of a user device 230, may use a browser to navigate to a web page or portal associated with interactive session system 240. The web page or portal may provide a user interface with which the user may interact to find a service in which the user is interested. For example, the web page or portal may provide a search box via which the user may enter one or more search terms, of a search query, that describe the service in which the user is interested. The user may instruct user device 230 to transmit the search query to interactive session system 240, and interactive session system 240 may receive the search query from user device 230.

Process 400 may include identifying organizations based on the search query (block 410). For example, interactive session system 240 may perform a search of the service provider information to identify organizations that are relevant to the one or more search terms of the search query.

In some implementations, interactive session system 240 may identify a topic associated with the search query and may identify an organization that is associated with that topic. As one example, assume that the search query includes the search terms "leaky faucet." In this case, interactive session system 240 may identify that "leaky faucet" is associated with the topic of plumbing and may identify organizations that offer services relating to plumbing. As another example, assume that the search query includes the search terms "help with calculus." In this case, interactive session system 240 may identify that "help with calculus" is associated with the topic of mathematics and may identify organizations that offer math tutoring services.

In some implementations, interactive session system 240 may match one or more search terms of the search query to keywords that have been previously associated with organizations. As one example, assume that the search query includes the search terms "planting flowers." In this case, interactive session system 240 may match the search term "planting" to the keyword "plant," and/or the search term "flowers" to the keyword "flower," either or both of which have been previously associated with particular organizations that provide gardening services.

Process 400 may include generating scores for the organizations using a first scoring function (block 415). For example, interactive session system 240 may generate a score for each (or a subset) of the organizations identified in block 410. Interactive session system 240 may use a particular set of signals (referred to as the "first scoring signals") to generate a score for each particular organization. The first scoring signals may include information regarding a quantity or a ratio of sessions, involving service providers associated with the particular organization, that resulted in a refund being requested. A refund request may indicate that a user was dissatisfied with a session with a service provider associated with the particular organization. Thus, the quantity or the ratio of sessions, which resulted in a refund request, may be used to generate a score for the particular organization.

Additionally, or alternatively, the first scoring signals may include information regarding lengths of sessions involving service providers associated with the particular organization. A longer session may be indicative of a better user experience than a shorter session—given that if the user is willing to pay for a longer session, the user is likely to be satisfied with the session. Thus, the length of sessions, involving the particular organization, may be used to generate a score for the particular organization.

Additionally, or alternatively, the first scoring signals may include information regarding ratings of the particular organization. Favorable (or unfavorable) ratings of the particular organization may be indicative of future favorable (or unfavorable) sessions involving the particular organization. For example, if users have provided favorable ratings to the particular organization, this may be indicative that the particular organization will continue to provide favorable services to users via future sessions. Thus, information regarding ratings of the particular organization may be used to generate a score for the particular organization.

Additionally, or alternatively, the first scoring signals may include information regarding reviews of the particular organization. User reviews may be analyzed to determine whether the wording is favorable, unfavorable, or neutral. Favorable (or unfavorable) reviews of the particular organization may be indicative of future favorable (or unfavorable) sessions involving the particular organization. For example, if users have provided favorable reviews—e.g., using favorable wording in reviews—for the particular organization, this may be indicative that the particular organization will continue to provide favorable services to users via future sessions. Thus, information regarding reviews of the particular organization may be used to generate a score for the particular organization.

Additionally, or alternatively, the first scoring signals may include information regarding ratings of one or more service providers associated with the particular organization. Favorable (or unfavorable) ratings of the one or more service providers may be indicative of future favorable (or unfavorable) sessions involving the one or more service providers or the particular organization. For example, if users have provided favorable ratings to the one or more service providers, this may be indicative that the one or more service providers will continue to provide favorable services to users via future sessions. Thus, information regarding ratings of the one or more service providers may be used to generate a score for the particular organization.

Additionally, or alternatively, the first scoring signals may include information regarding reviews of one or more service providers associated with the particular organization. Favorable (or unfavorable) reviews of the one or more service providers may be indicative of future favorable (or unfavorable) sessions involving the one or more service providers or the particular organization. For example, if users have provided favorable reviews to the one or more service providers, this may be indicative that the one or more service providers will continue to provide favorable services to users via future sessions. Thus, information regarding reviews of the one or more service providers may be used to generate a score for the particular organization.

Additionally, or alternatively, the first scoring signals may include information regarding prior sessions between the user and the particular organization. Previous favorable (or unfavorable) interactions between the user and the particular organization may be indicative of future favorable (or unfavorable) interactions between the user and the particular organization. For example, if the user has had prior sessions with service providers, of the particular organization, that have been favorable—which may be determined via favorable user ratings, favorable user reviews, a quantity of sessions between the user and the particular organization (e.g., a quantity that satisfies a threshold), a frequency of sessions between the user and the particular organization (e.g., a frequency that increases over time), and/or a length of sessions between the user and the particular organization (e.g., the sessions increase in length over time)—this may be indicative that the particular organization will continue to provide favorable services to the user via future sessions. Thus, information regarding prior sessions between the user and the particular organization may be may be used to generate a score for the particular organization for sessions with the user.

Additionally, or alternatively, the first scoring signals may include information regarding areas and/or levels of expertise of service providers associated with the particular organization. Certain service providers may be identified as having a particular level of expertise, such as expert or general knowledge, in particular areas. A higher level of expertise, in an area in which the user is seeking a service, may mean that the user is more likely to be satisfied with the session than a lower level of expertise in the area. Thus, areas and/or levels of expertise, of service providers associated with the particular organization, may be used to generate a score for the particular organization.

Additionally, or alternatively, the first scoring signals may include information regarding an amount of money that the user has spent for sessions. A user who spends more money for sessions with interactive session system 240 or spends an amount of money that satisfies a threshold may be provided with better treatment—e.g., be matched with service providers with better levels of expertise, be provided with lower or free charges for sessions, etc.—than a user who spends less money for sessions or spends an amount of money that does not satisfy the threshold. Thus, an amount of money that the user has spent for sessions may be used to determine a score for the particular organization.

Additionally, or alternatively, the first scoring signals may include information regarding time spent by the user searching for sessions, browsing for sessions, and/or involved in sessions. A user who interacts more frequently with interactive session system 240 and/or spends an amount of time, involved with interactive session system 240, that satisfies a threshold may be provided with better treatment—e.g., be matched with service providers with better levels of expertise, be provided with lower or free charges for sessions, etc.— than a user who interacts less frequently and/or spends an amount of time, involved with interactive session system 240, that does not satisfy the threshold. Thus, the time spent by the user may be used to determine a score for the particular organization.

Additionally, or alternatively, the first scoring signals may include information regarding waiting times of service providers associated with the particular organization. Some service providers may be involved in sessions with users and may, thus, be unavailable to service another user. Smaller waiting times (or no waiting times) may lead to better user satisfaction than longer waiting times. Thus, information regarding waiting times may be used to determine a score for the particular organization.

Additionally, or alternatively, the first scoring signals may include information regarding a cost charged for services by the particular organization. A lower cost may be indicative of a more favorable user experience than a higher cost. Thus, information regarding a cost charged for services may be used to determine a score for the particular organization.

Additionally, or alternatively, the first scoring signals may include information regarding a quality of connection of user device 230 and/or a communication device used by a service provider of the particular organization. A better quality of connection may be indicative of a more favorable user experience than a lower quality of connection. Thus, information regarding a quality of connection may be used to determine a score for the particular organization.

Additionally, or alternatively, the first scoring signals may include information regarding one or more geographic areas with which the particular organization, or a service provider of the particular organization, is associated. In some situations, a user may seek a service to be provided in a certain geographic area. In these situations, organizations or service providers located in that geographic area may lead to a more favorable user experience than organizations or service providers located outside of the geographic area. Thus, information regarding one or more geographic areas with which the particular organization, or a service provider of the particular organization, is associated may be used to determine a score for the particular organization.

The above signals are merely examples of first scoring signals that may be used to generate scores for the organizations. In some implementations, a score, for an organization, may be generated using signals different than, or in addition to, the first scoring signals identified above.

Interactive session system 240 may generate a score for the particular organization based on a first scoring function that uses one or more of the first scoring signals. In some implementations, the first scoring function may generate the score using a weighted combination of two or more of the first scoring signals. A weight assigned to one of the first scoring signals may be different than a weight assigned to another one of the first scoring signals. In some implementations, a weight assigned to one of the first scoring signals may be the same as a weight assigned to another one of the first scoring signals and may be different from a weight assigned to yet another one of the first scoring signals.

Process 400 may include forming a ranked list that includes information identifying organizations based on the scores (block 420). For example, interactive session system 240 may sort information identifying the organizations based on the scores for the organizations. Interactive session system 240 may form a ranked list with information identifying the organizations based on sorting the information identifying the organizations based on the scores. In some implementations, an organization with a higher score may be included higher in the ranked list than an organization with a lower score. In some implementations, the ranked list may include information regarding fewer than all of the identified organizations, such as information regarding the top scoring Y (Y>1) organizations and/or information regarding organizations with scores that satisfy a threshold.

Process 400 may include presenting the ranked list (block 425). Interactive session system 240 may generate a document, such as a web page, that includes the ranked list. In some implementations, the document may include, for a particular organization, information associated with the particular organization, such as a name of the particular organization, an image associated with the particular organization, descriptive text associated with the particular organization, a video associated with the particular organization, cost information associated with the particular organization, information regarding a rating or review of the particular organization, a link associated with the particular organization, or the like. In some implementations, the document may include additional and/or different information for a particular organization. Interactive session system 240 may transmit the document to a user device 230 for presentation on a display of the user device 230.

Process 400 may include receiving selection of an organization from the ranked list (block 430). User device 230 may receive the document and display the document to the user. The user may review the ranked list, within the document, and select an organization from the ranked list. User device 230 may receive an indication of the selection and provide information, regarding the selection, to interactive session system 240.

Process 400 may include identifying service providers, associated with the selected organization, based on the search query (block 435) (FIG. 4B). For example, interactive session system 240 may perform a search of the service provider information to identify service providers, associated with the selected organization, that are relevant to the one or more search terms of the search query.

In some implementations, interactive session system 240 may identify a topic associated with the search query and may identify service providers, associated with the selected organization, that offer services relating to that topic. As one example, assume that the search query includes the search terms "leaky faucet." In this case, interactive session system 240 may identify that "leaky faucet" is associated with the topic of plumbing and may identify service providers, associated with the selected organization, that offer services relating to plumbing. As another example, assume that the search query includes the search terms "help with calculus." In this case, interactive session system 240 may identify that "help with calculus" is associated with the topic of mathematics and may identify service providers, associated with the selected organization, that offer math tutoring services.

In some implementations, interactive session system 240 may match one or more search terms of the search query to keywords that have been previously associated with the service providers. As one example, assume that the search query includes the search terms "planting flowers." In this case, interactive session system 240 may match the search term "planting" to the keyword "plant," and/or the search term "flowers" to the keyword "flower," either or both of which have been previously associated with particular service providers that offer gardening services.

Process 400 may include generating scores for the service providers using a second scoring function (block 440). For example, interactive session system 240 may generate a score for each (or a subset) of the service providers identified in block 435. Interactive session system 240 may use a particular set of signals (referred to as the "second scoring signals") to generate a score for each particular service provider. The second scoring signals may be the same as, a subset of, or different than the first scoring signals identified above. In other words, one or more of the signals, described above as being used to generate a score for a particular organization, may be used to generate a score for a particular service provider associated with the particular organization.

For example, the second scoring signals may include information regarding a quantity or a ratio of sessions, involving a particular service provider, that resulted in a refund being requested. Additionally, or alternatively, the second scoring signals may include information regarding lengths of sessions involving the particular service provider. Additionally, or alternatively, the second scoring signals may include information regarding ratings of a particular organization with which the particular service provider is associated. Additionally, or alternatively, the second scoring signals may include information regarding reviews of the particular organization with which the particular service provider is associated. Additionally, or alternatively, the second scoring signals may include information regarding a rating of the particular service provider. Additionally, or alternatively, the second scoring signals may include information regarding reviews of the particular service provider.

Additionally, or alternatively, the second scoring signals may include information regarding prior sessions between the user and the particular service provider. Additionally, or alternatively, the second scoring signals may include information regarding area(s) and/or level(s) of expertise of the particular service provider. Additionally, or alternatively, the second scoring signals may include information regarding an amount of money that the user has spent for sessions. Additionally, or alternatively, the second scoring signals may include information regarding time spent by the user searching for sessions, browsing for sessions, and/or involved in sessions.

Additionally, or alternatively, the second scoring signals may include information regarding a waiting time of the particular service provider. Additionally, or alternatively, the second scoring signals may include information regarding a cost charged for a service by the particular service provider. Additionally, or alternatively, the second scoring signals may include information regarding a quality of connection of user device 230 and/or a communication device used by the particular service provider. Additionally, or alternatively, the second scoring signals may include information regarding one or more geographic areas with which the particular service provider is associated.

Interactive session system 240 may generate a score for the particular service provider based on a second scoring function that uses one or more of the second scoring signals. In some implementations, the second scoring function may generate the score using a weighted combination of two or more of the second scoring signals. A weight assigned to one of the second scoring signals may be different than a weight assigned to another one of the second scoring signals. In some implementations, a weight assigned to one of the second scoring signals may be the same as a weight assigned to another one of the second scoring signals and may be different from a weight assigned to yet another one of the second scoring signals.

In some implementations, the second scoring function is different from the first scoring function. In some examples of these implementations, the second scoring function may use the same scoring signals used by the first scoring function but may combine the scoring signals in different ways—e.g., may use different weights for different scoring signals. In some examples of these implementations, the second scoring function may use different scoring signals than the scoring signals used by the first scoring function. In some examples of these implementations, the second scoring function may use a subset of the scoring signals used by the first scoring function and may use the same weights for the scoring signals used in common. In some examples of these implementations, the second scoring function may use a subset of the scoring signals used by the first scoring function and may use different weights for the scoring signals used in common. In some implementations, the second scoring function is the same as the first scoring function.

Process 400 may include forming a ranked list that includes information identifying service providers based on the scores (block 445). For example, interactive session system 240 may sort information identifying the service providers based on the scores for the service providers. Interactive session system 240 may form a ranked list that includes information identifying the service providers based on sorting the information identifying the service providers based on the scores. In some implementations, a service provider with a higher score may be included higher in the ranked list than a service provider with a lower score. In some implementations, the ranked list may include information regarding fewer than all of the identified service providers, such as information regarding the top scoring Z (Z>1) service providers and/or information regarding service providers with scores that satisfy a threshold.

Process 400 may include presenting the ranked list (block 450). Interactive session system 240 may generate a document, such as a web page, that includes the ranked list. In some implementations, the document may include, for a particular service provider, information associated with the particular service provider, such as a name of the particular service provider, an image associated with the particular service provider, descriptive text associated with the particular service provider, a video associated with the particular service provider, cost information associated with the particular service provider, information regarding a rating or review of the particular service provider, a link associated with the particular service provider, a wait time for the particular service provider, a geographic location or time zone associated with the particular service provider, or the like. In some implementations, the document may include additional or different information for a particular service provider. Interactive session system 240 may transmit the document to a user device 230 for presentation on a display of the user device 230.

Process 400 may include receiving selection of a service provider from the ranked list (block 455). User device 230 may receive the document and display the document to the user. The user may review the ranked list, within the document, and select a service provider from the ranked list. User device 230 may receive an indication of the selection and provide information, regarding the selection, to interactive session system 240.

Process 400 may include causing an interactive session to be established between the user and the service provider (block 460). For example, interactive session system 240 may establish, or cause to be established, a connection with the user via the user device 230 and may establish, or cause to be established, a connection with the service provider via a communication device of organization system 204. Interactive session system 240 may then connect the two connections to establish an interactive session, such as a video communication session, between the user and the service provider. Via the interactive session, the service provider may provide the requested service, in real time, to the user.

In some implementations, interactive session system 240 may initiate a timer when the interactive session starts. Interactive session system 240 may use the timer to determine a charge for the interactive session. Interactive session system 240 may send information regarding the interactive session and the timer to a billing system. The billing system may debit an account associated with the user and credit an account associated with the organization with which the service provider is associated. In some implementations, rather than charging the user, interactive session system 240 may serve advertisements to the user to subsidize the cost of the interactive session.

In some implementations, interactive session system 240 may use information regarding the interactive session to improve the operation of interactive session system 240. For example, interactive session system 240 may store information regarding the interactive session as service provider information and/or session information, as described above. In some implementations, information regarding the interactive session may be used to adjust the first scoring function and/or the second scoring function. For example, information, regarding the interactive session, may be used to supplement the first scoring signals, the second scoring signals, a weight assigned to one or more of the first scoring signals, and/or a weight assigned to one or more of the second scoring signals.

As described above with regard to block 440, interactive session system 240 may generate scores for service providers using the second scoring signals. In some implementations, interactive session system 240 may automatically select and connect with one of the service providers, such as one of the service providers with a highest score, in a manner similar to that described above with regard to block 460. If two service providers happen to have identical highest scores, interactive session system 240 may select one of the service providers, such as the service provider with the lower fee, the service provider with the shorter wait time, the service provider who has the higher rating, the service provider who has performed a service for this user in the past, or the like. Thus, in these implementations, the user need not select a service provider from a ranked list. Rather, the selection is automatically made for the user based on the scores generated for the service providers.

In some implementations, rather than identifying organizations and service providers based on a search query, the organizations and/or the service providers may be identified from a topical directory. In these implementations, the user may browse the topical directory to find a topic in which the user is interested, and may select an organization and/or a service provider to obtain a service, associated with the topic, from the topical directory.

While a series of blocks has been described with regard to FIGS. 4A and 4B, the order of the blocks may be modified in some implementations. Further, non-dependent blocks may be performed in parallel. Also, one or more blocks may be omitted in some implementations.

Figure 5A:
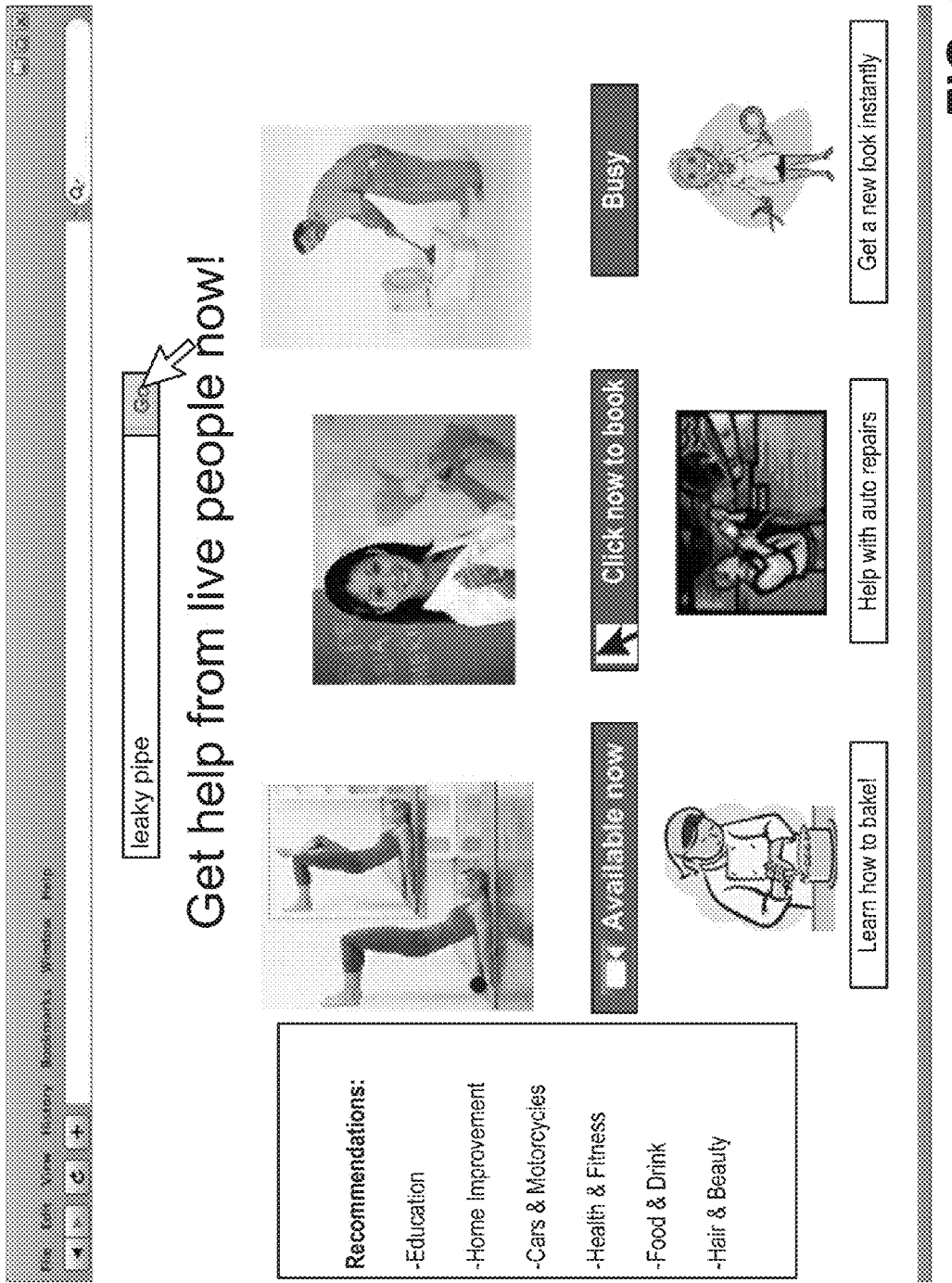
FIGS. 5A-5E illustrate an example for establishing a session between a user and a service provider.

FIGS. 5A-5E illustrate an example for establishing a session between a user and a service provider. Assume for this example, that a user desires to obtain a real-time service to assist the user in repairing a leaky pipe. As shown in FIG. 5A, the user may open a browser on a user device 230 and use the browser to navigate to a web site associated with interactive session system 240. Via the web site, interactive session system 240 may present the user with options for finding a service provider who offers the desired service. As shown in FIG. 5A, the web site may present the user with options to search or browse for the appropriate service provider. As shown in FIG. 5A, assume that the user decides to perform a search and enters the search query "leaky pipe."

As described above, interactive session system 240 may perform a search, based on the search query, to identify organizations that offer services that are relevant to the search query. Interactive session system 240 may generate scores for the identified organizations and may form a ranked list based on the scores. Interactive session system 240 may generate a document that includes the ranked list and may present the document to user device 230.

Figure 5B:
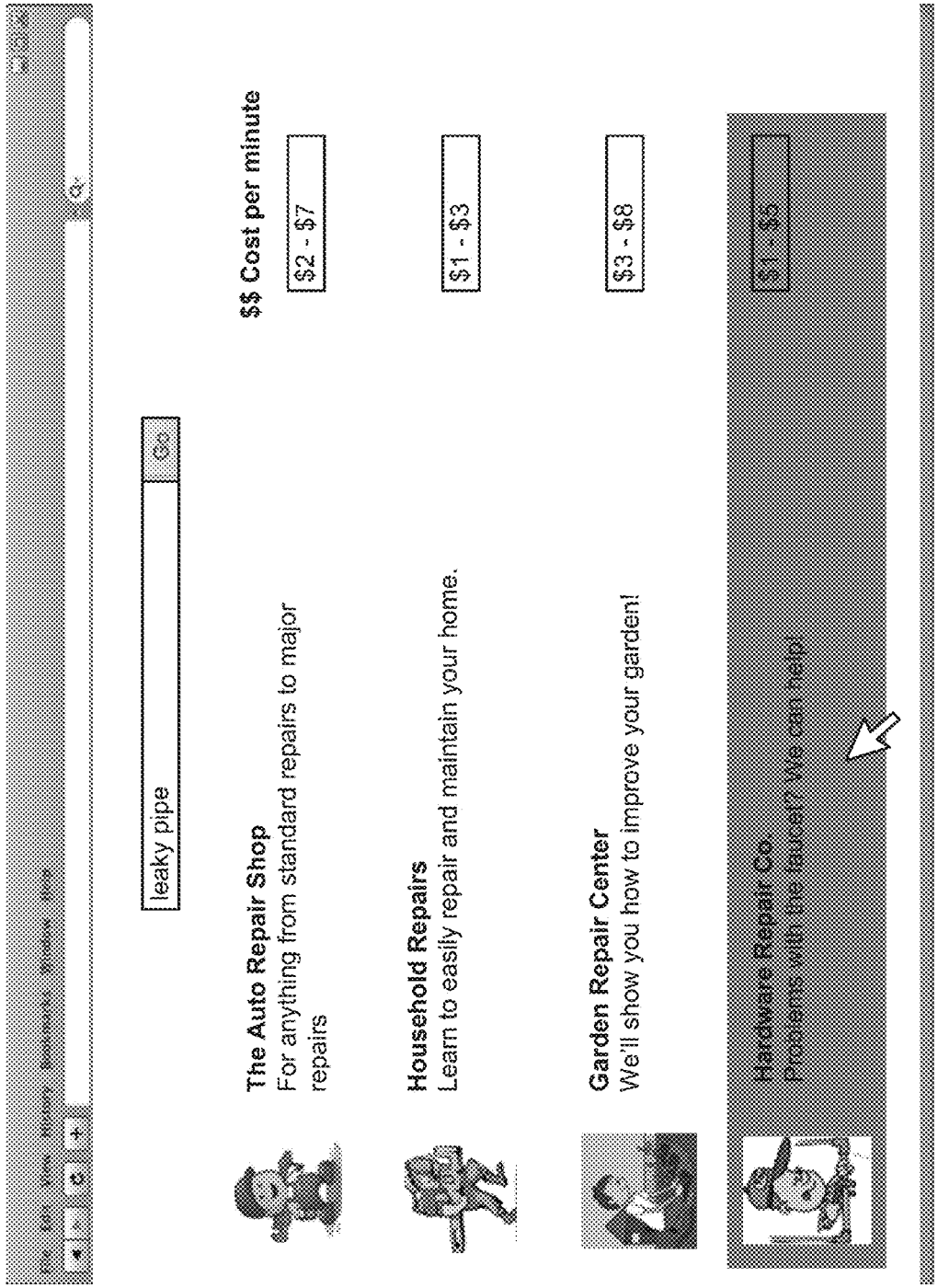

As shown in FIG. 5B, the document may include, for a particular organization, a name of the organization, descriptive text associated with the particular organization, an image associated with the particular organization, and a cost (or a range of cost values) for obtaining the service. Assume that the user selects the organization called the Hardware Repair Co. User device 230 may receive the selection and provide information, regarding the selection, to interactive session system 240.

As described above, interactive session system 240 may perform a search, based on the search query, to identify service providers, associated with the Hardware Repair Co. organization, that offer services that are relevant to the search query. Interactive session system 240 may generate scores for the identified service providers and may form a ranked list based on the scores. Interactive session system 240 may generate a document that includes the ranked list and may present the document to user device 230.

Figure 5C:
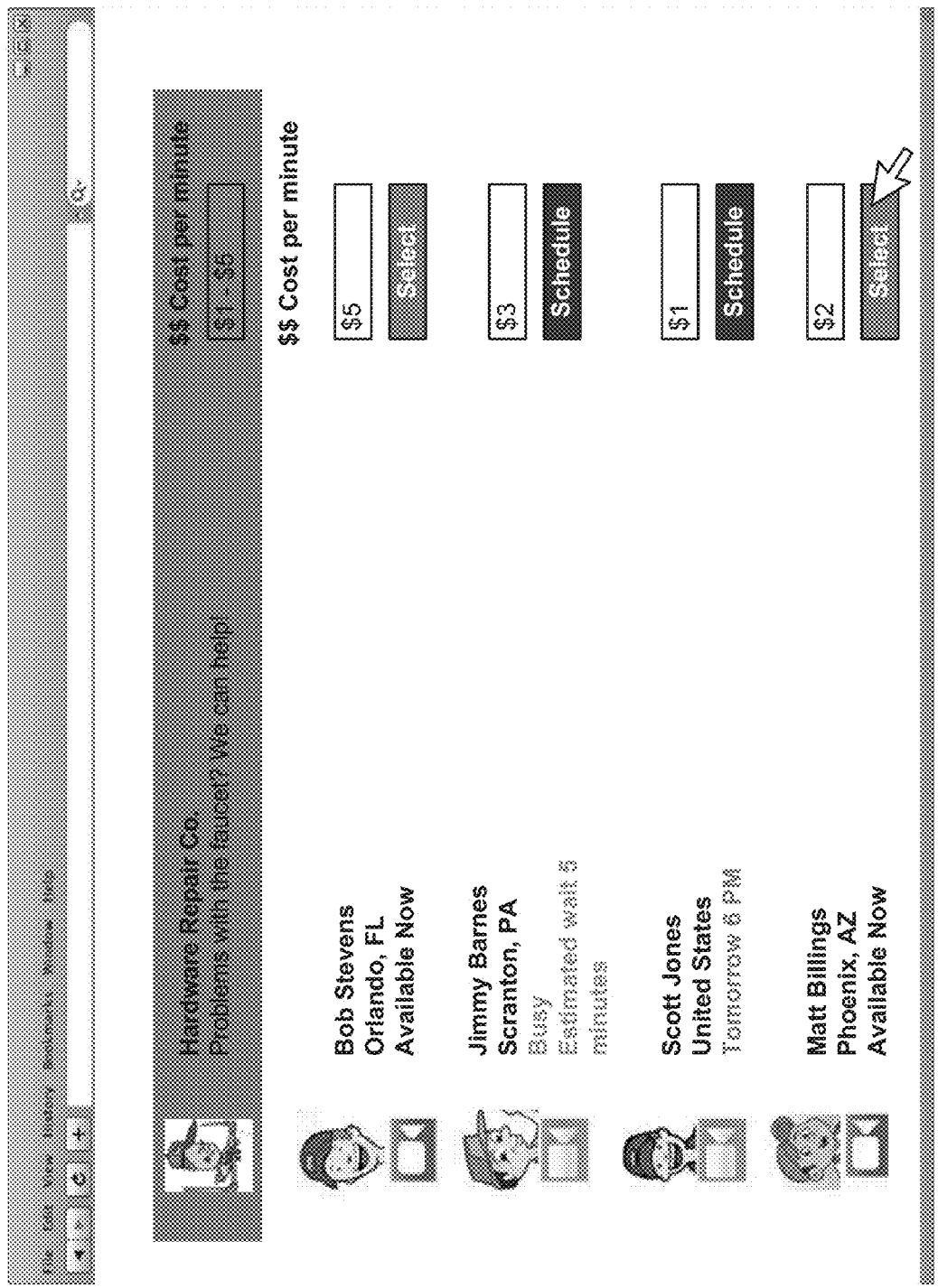

As shown in FIG. 5C, the document may include, for a particular service provider, a name of the service provider, an image associated with the particular service provider, a geographic location in which the particular service provider is located, a wait time associated with the particular service provider, and a cost for obtaining the service from the particular service provider. If the particular service provider is currently unavailable, the user may be given the opportunity to schedule a future session with the particular service provider. Assume that the user selects the service provider called Matt Billings. User device 230 may receive the selection and provide information, regarding the selection, to interactive session system 240.

Figure 5D:
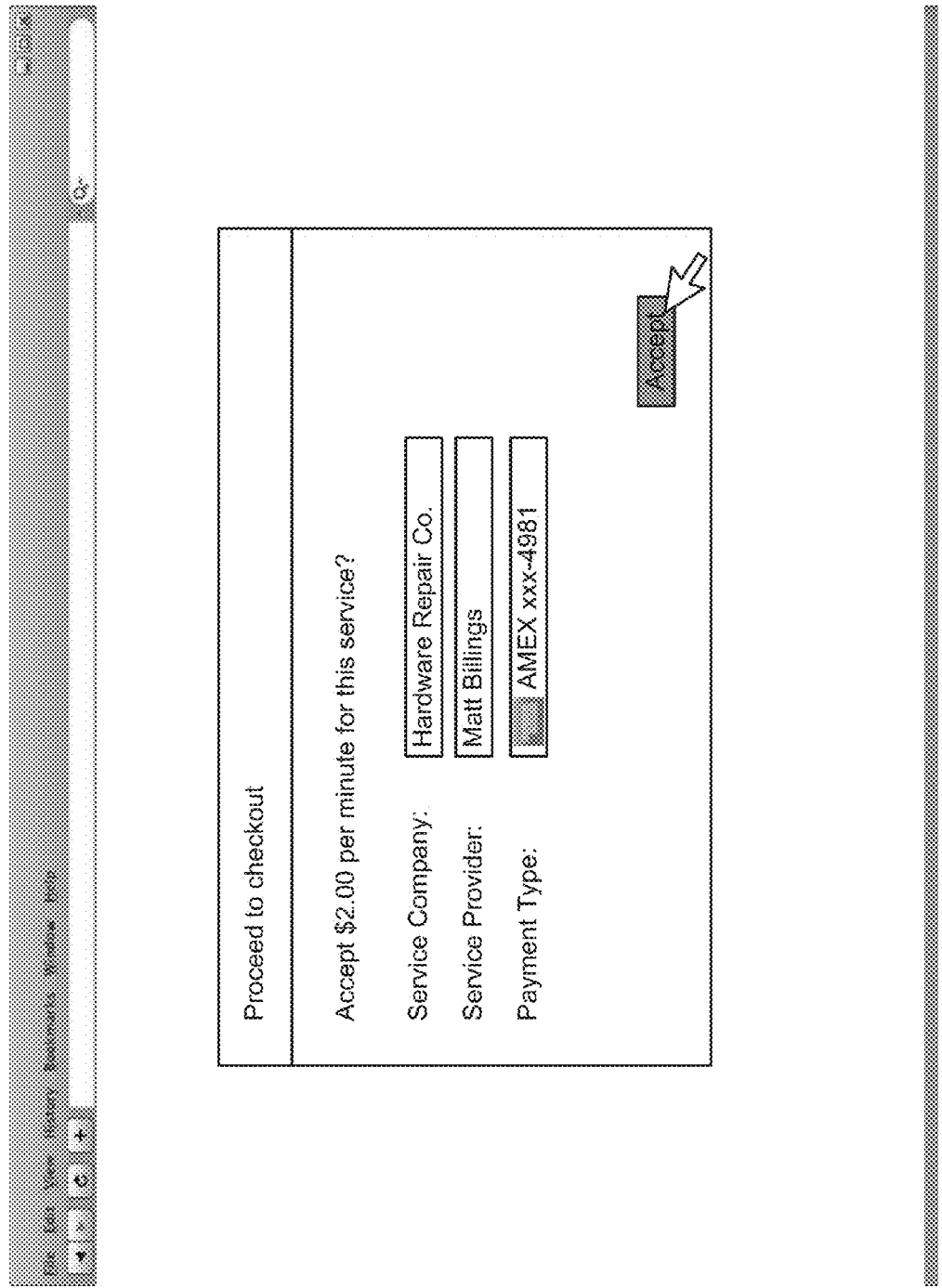

As shown in FIG. 5D, in response to the user's selection of the service provider, interactive session system 240 may present the user with a billing form via which the user can submit billing information—e.g., credit card information—to pay for the service. Assume that the user provides credit card information to pay for the service, and interactive session system 240 verifies that the credit card information is valid and accepts the credit card payment. Once the credit card payment is accepted, interactive session system 240 may present the service provider with a prompt to accept establishment of an interactive session. Assume that the service provider accepts the prompt.

Figure 5E:
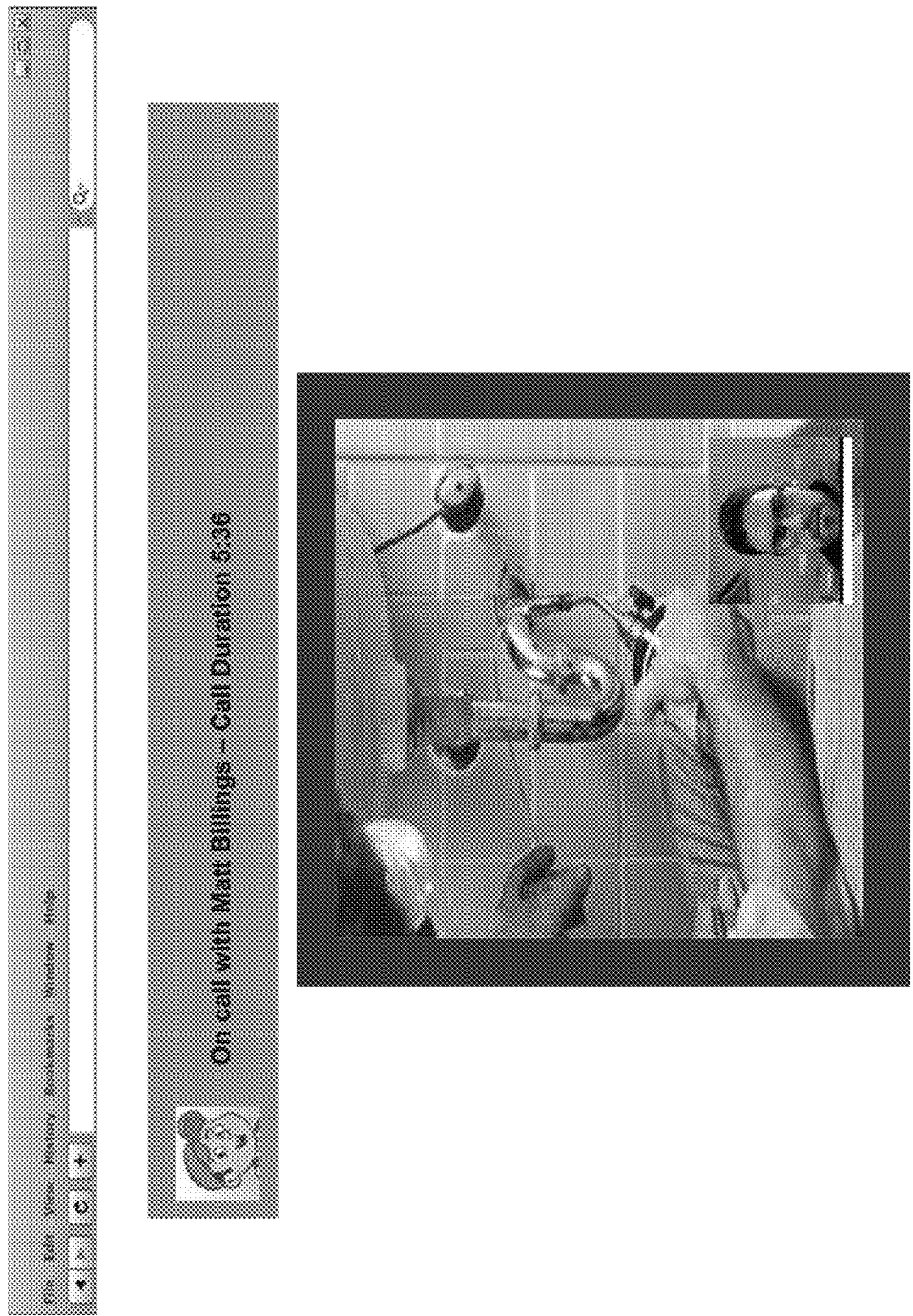

Interactive session system 240 may cause a video connection to be established with user device 230 and another video connection to be established with a communication device associated with the service provider. Interactive session system 240 may then connect the connections together to facilitate a real-time interactive session between the user and the service provider. As shown in FIG. 5E, the service provider may illustrate, to the user, how to repair a leaky pipe. The interface, shown to the user via user device 230, may include live video captured by the communication device of the service provider, the name of the service provider, and a value of the timer that reflects the duration of the interactive session. After the user or the service provider ends the interactive session, interactive session system 240 may cause a charge to be generated for the service.

The user may, thus, obtain a real-time service from a service provider who is experienced to assist the user.

While FIGS. 5B and 5C illustrate separate ranked lists for organizations and service providers, this need not be the case. In some implementations, the ranked lists may be combined. For example, interactive session system 240 may generate a document that identifies organizations based on the scores of the organizations and, for each organization, identifies one or more service providers based on the scores of the service providers. In other words, the document may list a group of the highest-scoring organizations, and for each of these organizations, the document may list a group of the highest-scoring service providers.

While FIG. 5C shows interactive session system 240 as providing a ranked list for service providers, this need not be the case. In some implementations, interactive session system 240 may perform a search, based on the search query, to identify service providers, associated with the Hardware Repair Co. organization, that offer services that are relevant to the search query. Interactive session system 240 may generate scores for the identified service providers and automatically select one of the identified service providers, such as one of the identified service providers with a highest score. In some implementations, interactive session system 240 may use some other factor or combination of factors, including or excluding the scores, to select one of the identified service providers. Thus, in these implementations, the user need not select a service provider from a ranked list. Rather, the selection is automatically made for the user.

Figure 6A:
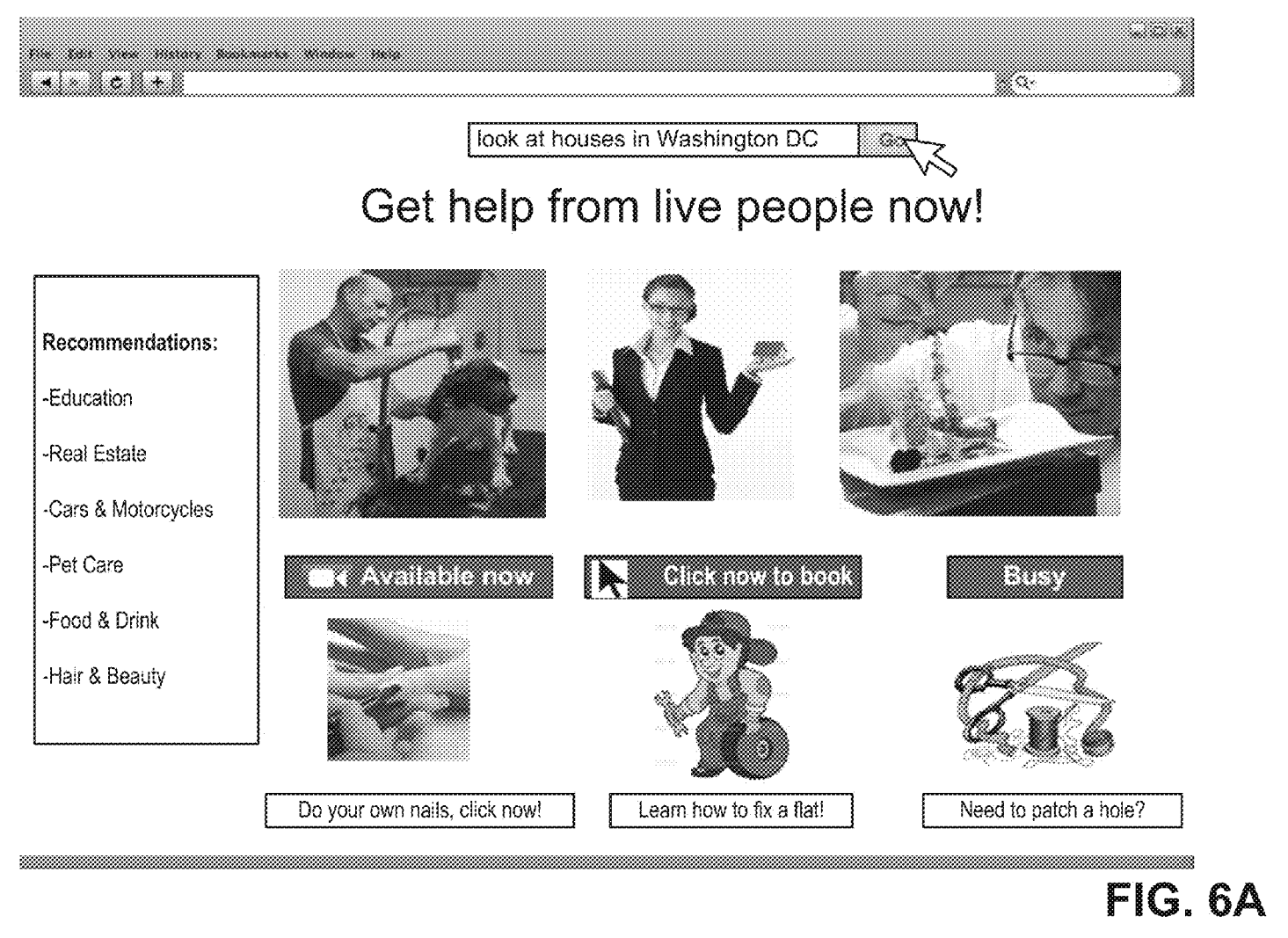
Figure 6B:
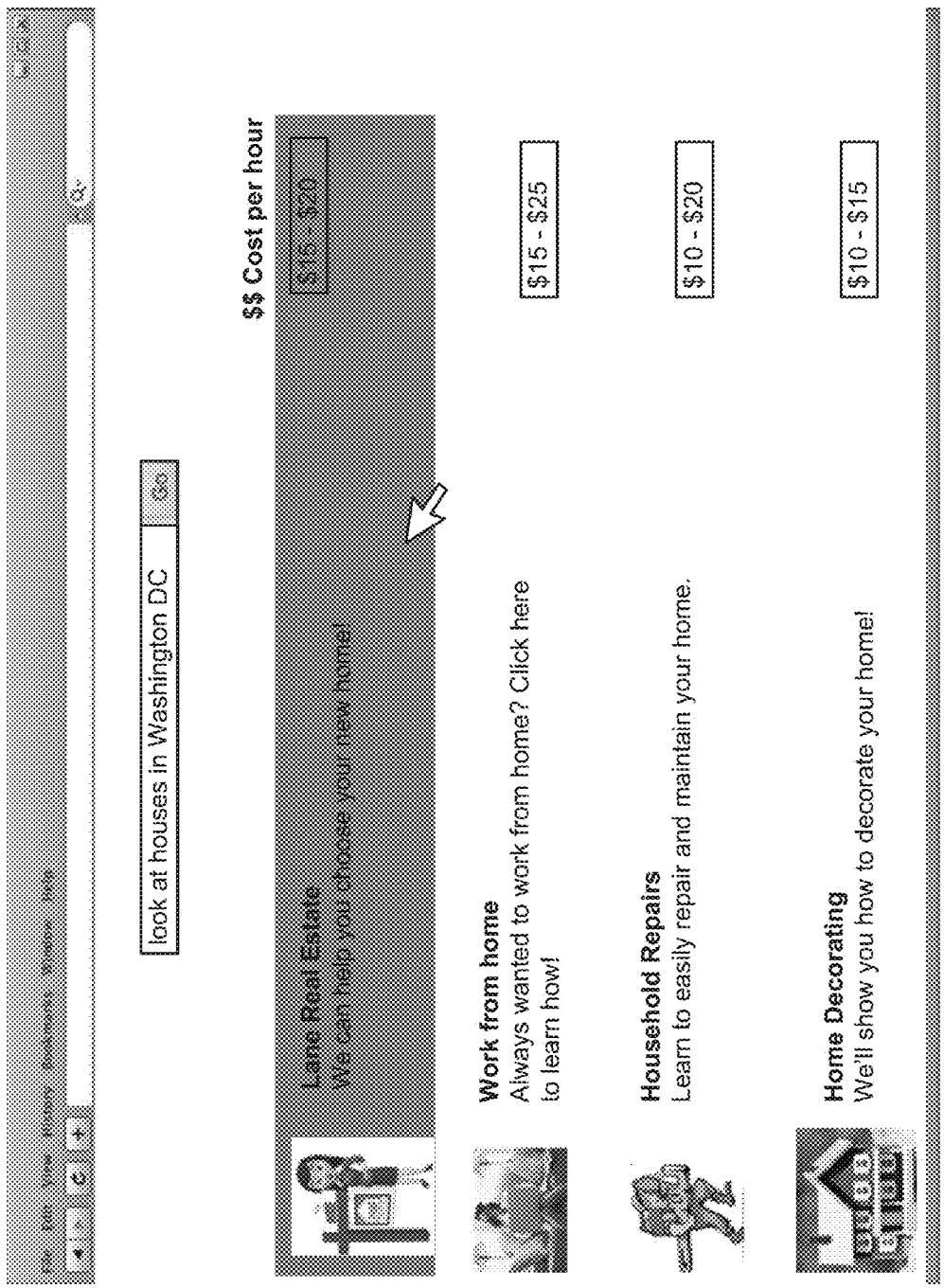

FIGS. 6A-6D illustrate another example process for establishing a session between a user and a service provider. Assume, for this example, that a user desires to obtain a real-time service to assist the user in finding a house to purchase. As shown in FIG. 6A, the user may open a browser on a user device 230 and use the browser to navigate to a web site associated with interactive session system 240. Via the web site, interactive session system 240 may present the user with options for finding a service provider who offers the desired service. As shown in FIG. 6A, the web site may present the user with options to search or browse for the appropriate service provider. As shown in FIG. 6A, assume that the user decides to perform a search and enters the search query "look at houses in Washington D.C."

As described above, interactive session system 240 may perform a search, based on the search query, to identify organizations that offer services that are relevant to the search query. Interactive session system 240 may generate scores for the identified organizations and may form a ranked list based on the scores. Interactive session system 240 may generate a document that includes the ranked list and may present the document to user device 230.

As shown in FIG. 6B, the document may include, for a particular organization, a name of the organization, descriptive text associated with the particular organization, an image associated with the particular organization, and a cost (or a range of cost values) for obtaining the service. Assume that the user selects the organization called the Lane Real Estate. User device 230 may receive the selection and provide information, regarding the selection, to interactive session system 240.

As described above, interactive session system 240 may perform a search, based on the search query, to identify service providers, associated with the Lane Real Estate organization, that offer services that are relevant to the search query. Interactive session system 240 may generate scores for the identified service providers and automatically select one of the identified service providers. In this example, assume that interactive session system 240 uses signals relating to waiting time and the geographic area(s) associated with the identified service providers to generate scores for the identified service providers. Also, in this example, assume that interactive session system 240 selects the highest scoring service provider—who will be called Mary Wilcox.

Figure 6C:
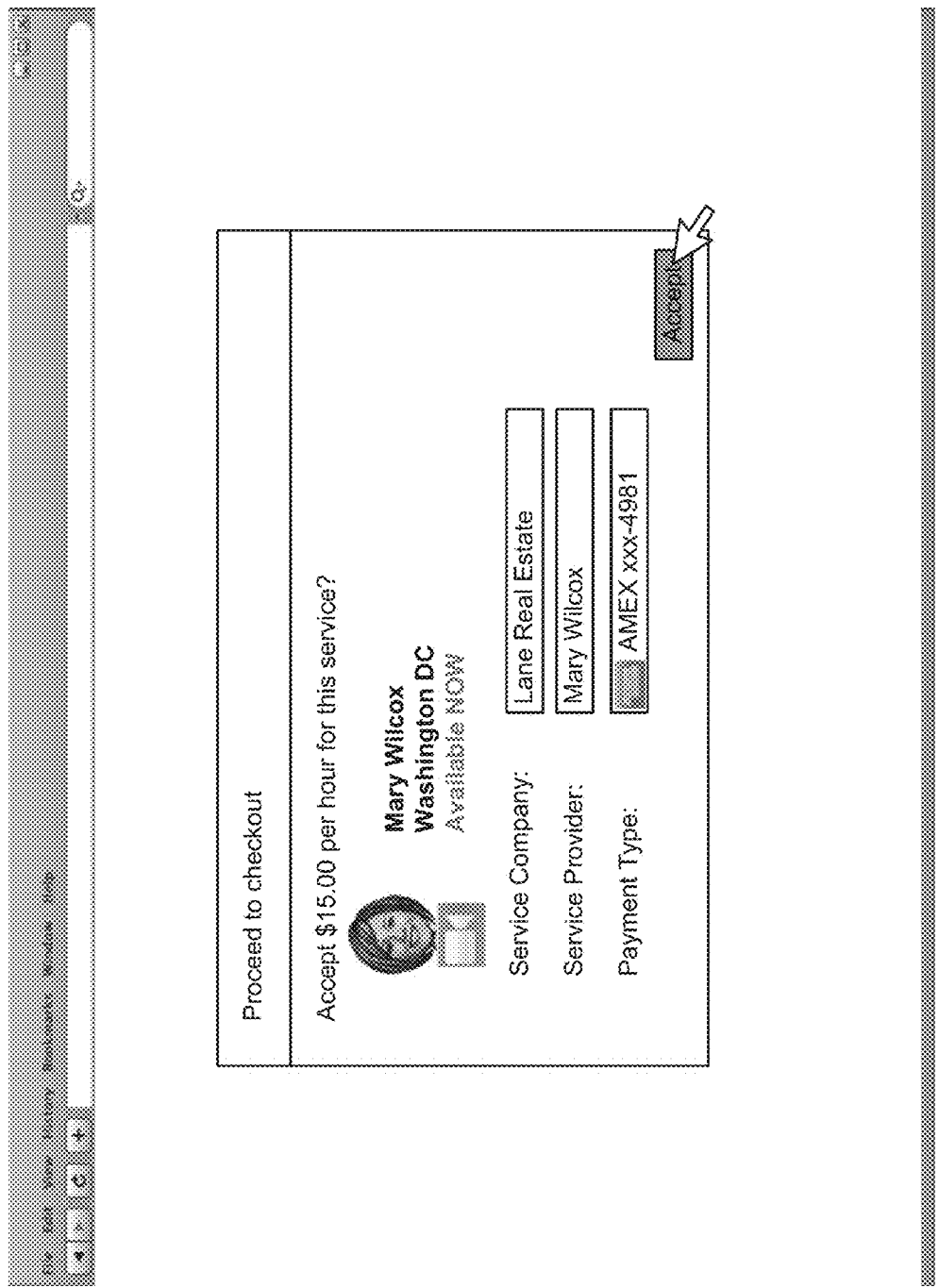

As shown in FIG. 6C, interactive session system 240 may present the user with a billing form via which the user can submit billing information—e.g., credit card information—to pay for the service. Assume that the user provides credit card information to pay for the service, and interactive session system 240 verifies that the credit card information is valid and accepts the credit card payment. Once the credit card payment is accepted, interactive session system 240 may present the service provider with a prompt to accept establishment of an interactive session. Assume that the service provider accepts the prompt.

Figure 6D:
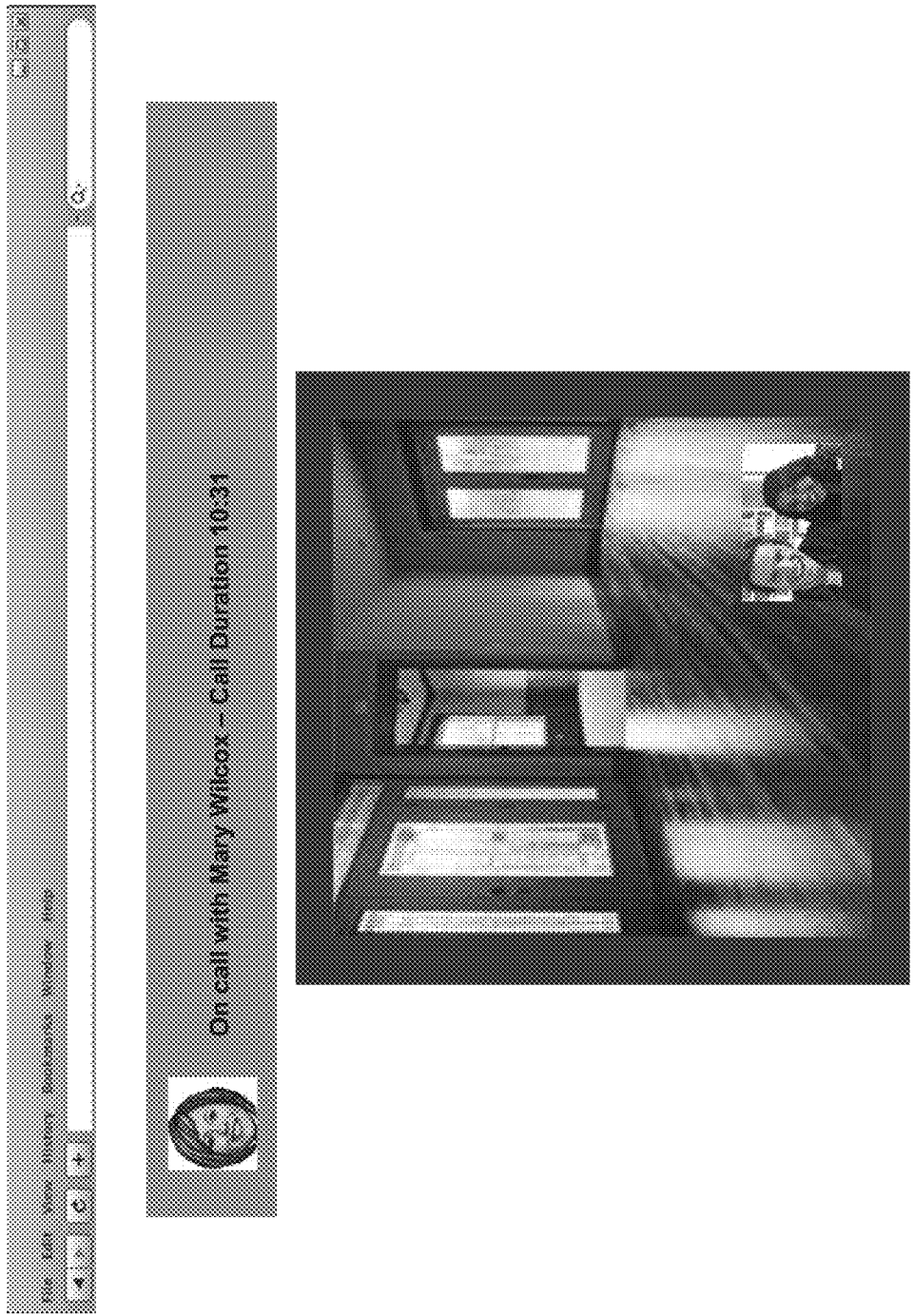

Interactive session system 240 may cause a video connection to be established with user device 230 and another video connection to be established with a communication device of the service provider. Interactive session system 240 may then connect the connections together to facilitate a real-time interactive session between the user and the service provider. As shown in FIG. 6D, the service provider may perform a walk-through of a house. The interface, shown to the user via user device 230, may include live video captured by the communication device of the service provider, the name of the service provider, and a value of the timer that reflects the duration of the interactive session. The user may instruct the service provider to go into certain rooms, show them certain features of the house, test the operations of the appliances, or the like. After the user or the service provider ends the interactive session, interactive session system 240 may cause a charge to be generated for the service.

The user may, thus, obtain a real-time service from a service provider who is experienced to assist the user.

Figure 7:
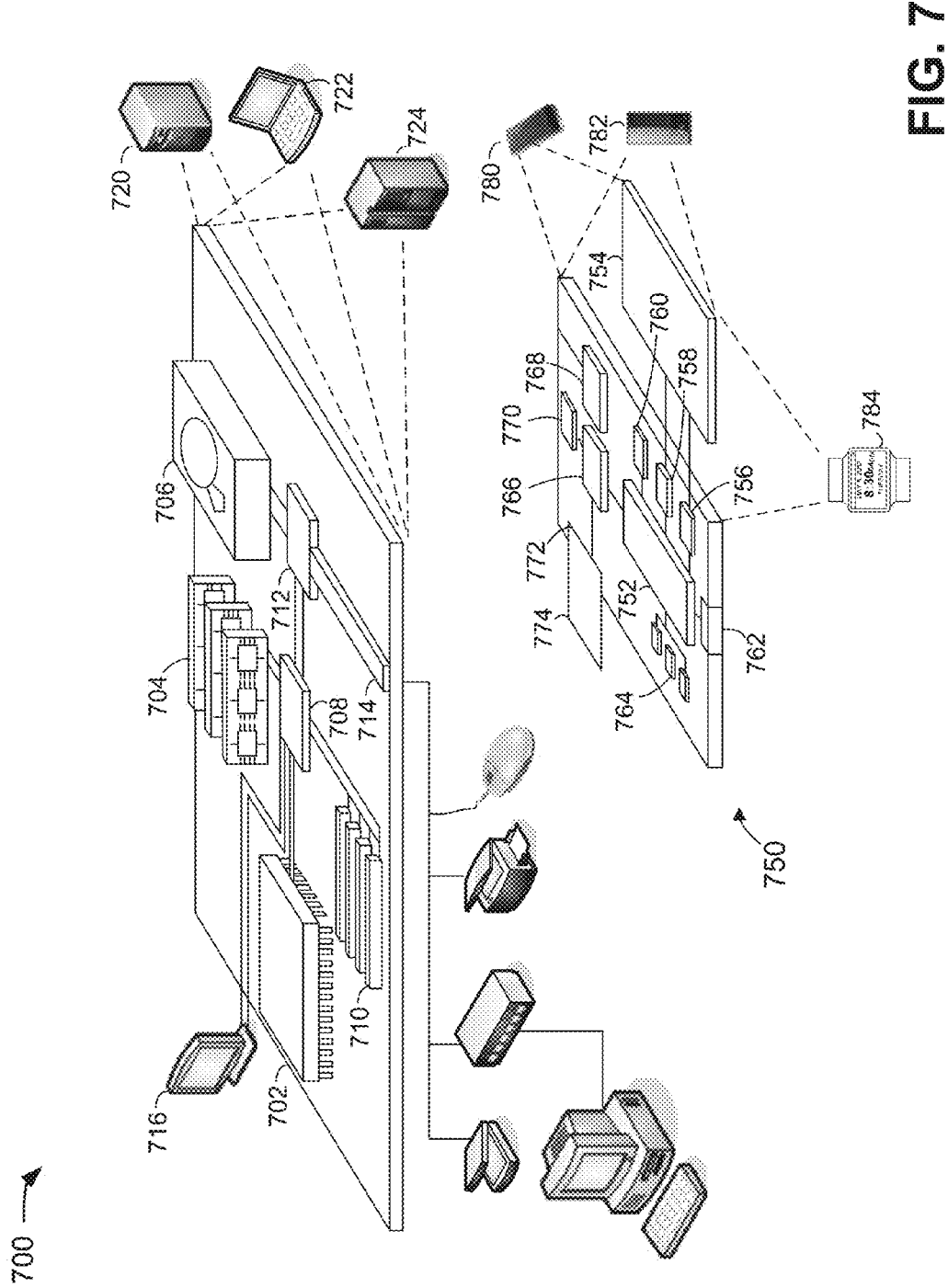
FIG. 7 is a diagram of an example of a generic computing device and a generic mobile computing device, which may be used with the techniques described here.

FIG. 7 is a diagram of an example of a generic computing device 700 and a generic mobile computing device 750, which may be used with the techniques described here. Generic computing device 700 or generic mobile computing device 750 may correspond to, for example, a communication device associated with organization systems 204, a server of a publisher web site 206, search system 210, content item management system 220, a user device 230, a server of interactive session system 240, and/or a device of production system 250. Computing device 700 is intended to represent various forms of digital computers, such as laptops, desktops, workstations, personal digital assistants, servers, blade servers, mainframes, and other appropriate computers. Mobile computing device 750 is intended to represent various forms of mobile devices, such as personal digital assistants, cellular telephones, smart phones, and other similar computing devices. The components shown in FIG. 7, their connections and relationships, and their functions, are meant to be examples only, and are not meant to limit implementations described herein.

Computing device 700 may include a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. Processor 702 can process instructions for execution within the computing device 700, including instructions stored in the memory 704 or on the storage device 706 to display graphical information for a graphical user interface (GUI) on an external input/output device, such as display 716 coupled to high speed interface 708. In some implementations, multiple processors and/or multiple buses may be used, as appropriate, along with multiple memories and types of memory. Also, multiple computing devices 700 may be connected, with each device providing portions of the necessary operations, as a server bank, a group of blade servers, or a multi-processor system, etc.

Memory 704 stores information within the computing device 700. In some implementations, memory 704 includes a volatile memory unit or units. In some implementations, memory 704 includes a non-volatile memory unit or units. The memory 704 may also be another form of computer-readable medium, such as a magnetic or optical disk. A computer-readable medium may refer to a non-transitory memory device. A memory device may refer to storage space within a single storage device or storage space spread across multiple storage devices.

The storage device 706 is capable of providing mass storage for the computing device 700. In some implementations, storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 704, storage device 706, or memory on processor 702.

High speed controller 708 manages bandwidth-intensive operations for the computing device 700, while low speed controller 712 manages lower bandwidth-intensive operations. Such allocation of functions is provided for explanatory purposes only. In some implementations, high-speed controller 708 is coupled to memory 704, display 716, e.g., through a graphics processor or accelerator, and to high-speed expansion ports 710, which may accept various expansion cards. In these implementations, low-speed controller 712 is coupled to storage device 706 and low-speed expansion port 714. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device, such as mobile computing device 750. Each of such devices may contain one or more of computing devices 700, 750, and an entire system may be made up of multiple computing devices 700, 750 communicating with each other.

Mobile computing device 750 may include a processor 752, memory 764, an input/output (I/O) device such as a display 754, a communication interface 766, and a transceiver 768, among other components. Mobile computing device 750 may also be provided with a storage device, such as a microdrive or other device, to provide additional storage. Each of the components 750, 752, 764, 754, 766, and 768 are interconnected using various buses, and several of the components may be mounted on a common motherboard or in other manners as appropriate.

Processor 752 can execute instructions within mobile computing device 750, including instructions stored in memory 764. Processor 752 may be implemented as a chipset of chips that include separate and multiple analog and digital processors. Processor 752 may provide, for example, for coordination of the other components of mobile computing device 750, such as control of user interfaces, applications run by mobile computing device 750, and wireless communication by mobile computing device 750.

Processor 752 may communicate with a user through control interface 758 and display interface 756 coupled to a display 754. Display 754 may be, for example, a Thin-Film-Transistor Liquid Crystal Display (TFT LCD) or an Organic Light Emitting Diode (OLED) display, or other appropriate display technology. Display interface 756 may comprise appropriate circuitry for driving display 754 to present graphical and other information to a user. Control interface 758 may receive commands from a user and convert them for submission to the processor 752. In addition, an external interface 762 may be provide in communication with processor 752, so as to enable near area communication of mobile computing device 750 with other devices. External interface 762 may provide, for example, for wired communication in some implementations, or for wireless communication in some implementations, and multiple interfaces may also be used.

Memory 764 stores information within mobile computing device 750. Memory 764 can be implemented as one or more of a computer-readable medium or media, a volatile memory unit or units, or a non-volatile memory unit or units. Expansion memory 774 may also be provided and connected to mobile computing device 750 through expansion interface 772, which may include, for example, a Single In Line Memory Module (SIMM) card interface. Such expansion memory 774 may provide extra storage space for device 750, or may also store applications or other information for mobile computing device 750. Specifically, expansion memory 774 may include instructions to carry out or supplement the processes described above, and may include secure information also. Thus, for example, expansion memory 774 may be provide as a security module for mobile computing device 750, and may be programmed with instructions that permit secure use of device 750. In addition, secure applications may be provided via the SIMM cards, along with additional information, such as placing identifying information on the SIMM card in a non-hackable manner.

Expansion memory 774 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Mobile computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver. In addition, Global Positioning System (GPS) receiver module 770 may provide additional navigation- and location-related wireless data to mobile computing device 750, which may be used as appropriate by applications running on mobile computing device 750.

Mobile computing device 750 may also communicate audibly using audio codec 760, which may receive spoken information from a user and convert it to usable digital information. Audio codec 760 may likewise generate audible sound for a user, such as through a speaker, e.g., in a handset of mobile computing device 750. Such sound may include sound from voice telephone calls, may include recorded sound, e.g., voice messages, music files, etc., and may also include sound generated by applications operating on mobile computing device 750.

Mobile computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described herein can be realized in digital electronic circuitry, integrated circuitry, specially designed application specific integrated circuits (ASICs), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with some implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Systems and/or methods, described herein, may provide real-time interactive sessions between users and service providers to permit the service providers to provide real-time services to the users. The systems and/or methods may provide a marketplace via which the users can search for, select, and/or interact with the best-matching service providers. The seamless connection of users and service providers may maximize user satisfaction in finding and obtaining real-time services.

The foregoing description provides illustration and description, but is not intended to be exhaustive or to limit the implementations to the precise form disclosed. Modifications and variations are possible in light of the above implementations or may be acquired from practice of the implementations.

Also, example user interfaces have been described with respect to FIGS. 5A-5E and 6A-6D. In some implementations, the user interfaces may include additional items of information, fewer items of information, different items of information, or differently arranged items of information. In some implementations, the user interfaces may provide a user with sorting options. For example, the user may be able to sort a list that identifies organizations or service providers by price, by geographic location, by waiting time, by relevance to the search query, or the like.

Additionally, while some examples of scores and thresholds were described above, other examples are possible in addition to, or in lieu of, the scores and/or thresholds described above. For example, in some implementations, a value that is described as satisfying a threshold may be greater than, or equal to, the threshold. In some implementations, a value that is described as satisfying a threshold may not be greater than, or equal to, the threshold. In some implementations, a value that is described as not satisfying a threshold may be less than, or equal to, the threshold. In some implementations, a value that is described as not satisfying a threshold may not be less than, or equal to, the threshold.

As used herein, the term component refers to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more server devices, comprising:

receiving service provider information from devices associated with a plurality of organizations, the service provider information received from a respective device associated with a respective organization including an identifier of the respective organization, information identifying respective service providers employed by the respective organization, and information identifying respective services offered by the respective organization;

mapping each of the plurality of organizations to topics based on the service provider information;

receiving, by at least one of the one or more server devices, a search query from a user device;

identifying, by at least one of the one or more server devices, a subset of the plurality of organizations that offer services relevant to the search query, where identifying the subset of the plurality of organizations includes:

identifying a topic associated with the search query; and identifying the subset of the plurality of organizations based on the plurality of organizations being mapped to the topic associated with the search query;

generating, by at least one of the one or more server devices, first scores for the subset of the plurality of organizations using a first scoring function;

generating, by at least one of the one or more server devices, a document that includes information identifying the subset of the plurality of organizations based on the first scores;

providing, by at least one of the one or more server devices, the document to the user device;

receiving, by at least one of the one or more server devices and based on providing the document to the user device, information indicating a selection of one of the subset of the plurality of organizations as a selected organization;

identifying, by at least one of the one or more server devices, a plurality of service providers, associated with the selected organization, that offer the services relevant to the search query;

generating, by at least one of the one or more server devices, second scores for the plurality of service providers using a second scoring function, the second scoring function being different from the first scoring function;

selecting or receiving selection of one of the plurality of service providers, as a selected service provider, based on the second scores;

causing, by at least one of the one or more server devices, a video communication session to be established between the user device and a device associated with the selected service provider;

receiving feedback from a user of the user device, the feedback relating to the video communication session between the user device and the device associated with the selected service provider; and adjusting the first scoring function used to generate the first scores for the subset of the plurality of organizations based on the feedback.

2. The method of claim 1, where the first scoring function uses a different set of signals than a set of signals used by the second scoring function.

3. The method of claim 1, where the first scoring function uses a same set of signals as the second scoring function, the first scoring function assigning first weights to the set of signals, the second scoring function assigning second weights to the set of signals, the first weights being different than the second weights.

4. The method of claim 1, where selecting or receiving selection of the one of the plurality of service providers includes:

automatically selecting the one of the plurality of service providers, the one of the plurality of service providers having a highest score of the second scores for the plurality of service providers.

5. The method of claim 1, where the document is a first document, where selecting or receiving selection of the one of the plurality of service providers includes:

generating a second document that includes information identifying the plurality of service providers based on the second scores, providing the second document to the user device, and receiving, based on providing the second document to the user device, information indicating a selection of the one of the plurality of service providers as the selected service provider.

6. The method of claim 1, further comprising:

using the feedback to adjust the second scoring function.

7. The method of claim 1, where the video communication session permits the selected service provider to provide, in real time, a service to a user of the user device.

8. The method of claim 1, where identifying the plurality of service providers includes:

identifying the plurality of service providers based on the plurality of service providers being employed by the selected organization.

9. The method of claim 1, where at least one of the first scoring function or the second scoring function is based on information regarding lengths of video communication sessions involving service providers associated with the plurality of organizations, where a longer length of a video communication session causes at least one of a higher first score or a higher second score than caused by a shorter length of a video communication session.

10. A system, comprising:

one or more server devices to:

receive service provider information from devices associated with a plurality of organizations, the service provider information received from a respective device associated with a respective organization including an identifier of the respective organization, information identifying respective service providers employed by the respective organization, and information identifying respective services offered by the respective organization;

map each of the plurality of organizations to topics based on the service provider information;

receive a search query from a user device;

identify a subset of the plurality of organizations that offer services relevant to the search query, where identifying the subset of the plurality of organizations includes:

identifying a topic associated with the search query; and identifying the subset of the plurality of organizations based on the plurality of organizations being mapped to the topic associated with the search query;

generate first scores for the subset of the plurality of organizations using a first scoring function;

generate a document that includes information identifying the subset of the plurality of organizations based on the first scores;

provide the document to the user device;

receive, based on providing the document to the user device, information indicating a selection of one of the subset of the plurality of organizations as a selected organization;

identify a plurality of service providers, associated with the selected organization, that offer the services relevant to the search query;

generate second scores for the plurality of service providers using a second scoring function, the second scoring function being different from the first scoring function;

select one of the plurality of service providers, as a selected service provider, based on the second scores;

cause a video communication session to be established between the user device and a device associated with the selected service provider;

receive feedback from a user of the user device, the feedback relating to the video communication session between the user device and the device associated with the selected service provider; and adjust the first scoring function used to generate the first scores for the subset of the plurality of organizations based on the feedback.

11. The system of claim 10, where the one or more server devices, when generating the document, are to:
   form a ranked list that includes information identifying the plurality of organizations in an order based on the first scores, and
   generate the document to include information from the ranked list.

12. The system of claim 10, where the one or more server devices, when selecting the one of the plurality of service providers, are to:
   automatically select the one of the plurality of service providers,
      the one of the plurality of service providers having a highest score of the second scores for the plurality of service providers.

13. The system of claim 10, where the one or more server devices are further to:
   determine a length of time associated with the video communication session; and
   send information regarding the length of time to a billing server for calculation of a charge for the video communication session.

14. The system of claim 10, where the video communication session permits the selected service provider to provide, in real time, a service to a user of the user device.

15. The system of claim 10, where at least one of the first scoring function or the second scoring function uses a plurality of signals that includes two or more of:
   information regarding a quantity or a ratio of video communication sessions involving service providers associated with the plurality of organizations,
   information regarding lengths of video communication sessions involving service providers associated with the plurality of organizations,
   information regarding ratings of the plurality of organizations,
   information regarding reviews of the plurality of organizations,
   information regarding ratings of service providers associated with the plurality of organizations,
   information regarding reviews of service providers associated with the plurality of organizations,
   information regarding prior video communication sessions between a user of the user device and service providers associated with the plurality of organizations,
   information regarding areas or levels of expertise of service providers associated with the plurality of organizations,
   information regarding an amount of money that a user of the user device has spent for video communication sessions,
   information regarding time spent by a user of the user device searching for video communication sessions, browsing for video communication sessions, or involved in video communication sessions,
   information regarding waiting times of service providers associated with the plurality of organizations,
   information regarding a cost charged for services by the plurality of organizations,
   information regarding one or more geographic areas with which the plurality of organizations or service providers associated with the plurality of organizations are associated, or
   information regarding a quality of connection of the user device or communication devices used by service providers associated with the plurality of organizations.

16. A non-transitory computer-readable medium storing instructions, the instructions comprising:
   a plurality of instructions which, when executed by one or more processors associated with one or more server devices, cause the one or more processors to:
   receive service provider information from devices associated with a plurality of organizations,
   the service provider information received from a respective device associated with a respective organization including an identifier of the respective organization, information identifying respective service providers employed by the respective organization, and information identifying respective services offered by the respective organization;
   map each of the plurality of organizations to topics based on the service provider information;
   receive a search query from a user device;
   identify a subset of the plurality of organizations that offer services relevant to the search query,
   where identifying the subset of the plurality of organizations includes:
      identifying a topic associated with the search query; and
      identifying the subset of the plurality of organizations based on the plurality of organizations being mapped to the topic associated with the search query;
   generate first scores for the subset of the plurality of organizations using a first scoring function;
   generate first scores for the subset of the plurality of organizations using a first scoring function;
   generate a document that includes information identifying the plurality of organizations based on the first scores;
   provide the document to the user device;
   receive, based on providing the document to the user device, information indicating a selection of one of the subset of the plurality of organizations as a selected organization;
   identify a plurality of service providers, associated with the selected organization, that offer the services relevant to the search query;
   generate second scores for the plurality of service providers using a second scoring function,
      the second scoring function being different from the first scoring function;
   receive selection of one of the plurality of service providers, as a selected service provider, based on the second scores;
   cause a video communication session to be established between the user device and a device associated with the selected service provider;
   receive feedback from the user device,
      the feedback relating to the video communication session between the user device and the device associated with the selected service provider; and
   adjust the first scoring function used to generate the first scores for the subset of the plurality of organizations based on the feedback.

17. The non-transitory computer-readable medium of claim 16, where the first scoring function uses a different set of signals than a set of signals used by the second scoring function.

18. The non-transitory computer-readable medium of claim 16, where the first scoring function uses a same set of signals as the second scoring function, the first scoring function assigning first weights to the set of signals, the second scoring function assigning second weights to the set of signals, the first weights being different than the second weights.

19. The non-transitory computer-readable medium of claim 16, where the document is a first document, where one more instructions, of the plurality of instructions, to receive selection of the one of the plurality of service providers, further cause the one or more processors to:

generate a second document that includes information identifying the plurality of service providers based on the second scores, provide the second document to the user device, and receive, based on providing the second document to the user device, information indicating a selection of the one of the plurality of service providers as the selected service provider.

* * * * *